United States Patent
Yum

(10) Patent No.: US 9,033,795 B2
(45) Date of Patent: May 19, 2015

(54) INTERACTIVE MUSIC GAME

(75) Inventor: Michael Yum, Los Angeles, CA (US)

(73) Assignee: Krew Game Studios LLC, Los Angeles, CA (US)

( * ) Notice: Subject to any disclaimer, the term of this patent is extended or adjusted under 35 U.S.C. 154(b) by 46 days.

(21) Appl. No.: 13/368,269

(22) Filed: Feb. 7, 2012

(65) Prior Publication Data

US 2013/0203492 A1    Aug. 8, 2013

(51) Int. Cl.
*A63F 9/00* (2006.01)
*A63F 13/20* (2014.01)
*A63F 13/40* (2014.01)
*A63F 13/30* (2014.01)

(52) U.S. Cl.
CPC .............. *A63F 13/06* (2013.01); *A63F 13/10* (2013.01); *A63F 13/12* (2013.01); *A63F 2300/1075* (2013.01); *A63F 2300/8047* (2013.01)

(58) Field of Classification Search
CPC .......................... A63F 2300/8047; A63F 13/06
See application file for complete search history.

(56) References Cited

U.S. PATENT DOCUMENTS

| | | | |
|---|---|---|---|
| 6,011,212 A | 1/2000 | Rigopulos et al. | |
| 6,353,174 B1 | 3/2002 | Schmidt et al. | |
| 6,379,244 B1 * | 4/2002 | Sagawa et al. | 463/7 |
| 6,429,863 B1 | 8/2002 | LoPiccolo et al. | |
| 6,430,997 B1 | 8/2002 | French et al. | |
| 6,461,239 B1 | 10/2002 | Sagawa et al. | |
| 6,554,706 B2 * | 4/2003 | Kim et al. | 463/36 |
| 6,663,491 B2 * | 12/2003 | Watabe et al. | 463/36 |
| 6,905,413 B1 | 6/2005 | Terao et al. | |
| 7,071,914 B1 * | 7/2006 | Marks | 345/156 |
| 7,320,643 B1 * | 1/2008 | Brosius et al. | 463/37 |
| 7,367,887 B2 * | 5/2008 | Watabe et al. | 463/36 |
| 7,459,624 B2 * | 12/2008 | Schmidt et al. | 84/477 R |
| 7,559,841 B2 * | 7/2009 | Hashimoto | 463/36 |
| 7,597,622 B2 * | 10/2009 | Takase | 463/33 |
| 7,718,884 B2 | 5/2010 | Jessop | |
| 7,785,201 B2 * | 8/2010 | Hashimoto | 463/36 |
| 7,828,659 B2 * | 11/2010 | Wada | 463/36 |
| 7,864,168 B2 | 1/2011 | French | |
| 7,911,447 B2 * | 3/2011 | Kouno | 345/158 |
| 7,923,620 B2 | 4/2011 | Foster | |
| 7,959,511 B2 * | 6/2011 | Kouno | 463/31 |
| 8,003,872 B2 | 8/2011 | Lopiccolo et al. | |
| 8,017,854 B2 | 9/2011 | Foster et al. | |
| 8,057,290 B2 * | 11/2011 | Vance et al. | 463/7 |
| 8,128,499 B2 * | 3/2012 | Yamazaki et al. | 463/36 |
| 8,408,999 B2 * | 4/2013 | Asami | 463/31 |
| 8,409,005 B2 * | 4/2013 | Nakano et al. | 463/37 |
| 8,444,464 B2 * | 5/2013 | Boch et al. | 463/7 |
| 8,444,486 B2 * | 5/2013 | Kay et al. | 463/31 |
| 2002/0019258 A1 * | 2/2002 | Kim et al. | 463/36 |
| 2002/0055383 A1 * | 5/2002 | Onda et al. | 463/36 |
| 2002/0160823 A1 * | 10/2002 | Watabe et al. | 463/7 |
| 2004/0005924 A1 * | 1/2004 | Watabe et al. | 463/36 |
| 2004/0063480 A1 * | 4/2004 | Wang | 463/8 |
| 2004/0063481 A1 * | 4/2004 | Wang | 463/8 |
| 2004/0242321 A1 * | 12/2004 | Overton | 463/29 |

(Continued)

*Primary Examiner* — Seng H Lim
(74) *Attorney, Agent, or Firm* — Orrick, Herrington & Sutcliffe LLP

(57) ABSTRACT

Disclosed herein are methods, systems, computer program products, and devices associated with a music action game, wherein a user can interact, by means of an input device, with the graphics and music associated with a music video playing on a gaming platform. The player's interactions can alter the song or music video during gameplay, which can be recorded and stored in a memory of the gaming platform.

34 Claims, 41 Drawing Sheets

(56) References Cited

U.S. PATENT DOCUMENTS

| | | | |
|---|---|---|---|
| 2005/0096132 A1* | 5/2005 | Ueshima et al. | 463/37 |
| 2005/0215319 A1 | 9/2005 | Rigopulos et al. | |
| 2005/0221892 A1* | 10/2005 | Takase | 463/36 |
| 2006/0046846 A1* | 3/2006 | Hashimoto | 463/36 |
| 2006/0046847 A1* | 3/2006 | Hashimoto | 463/36 |
| 2006/0058101 A1 | 3/2006 | Rigopulos | |
| 2007/0163427 A1* | 7/2007 | Rigopulos et al. | 84/609 |
| 2007/0254739 A1* | 11/2007 | Wada | 463/36 |
| 2007/0270222 A1* | 11/2007 | Yamanaka et al. | 463/37 |
| 2008/0058100 A1* | 3/2008 | Kouno | 463/31 |
| 2008/0098448 A1* | 4/2008 | Mondesir et al. | 725/126 |
| 2008/0146302 A1* | 6/2008 | Olsen et al. | 463/7 |
| 2008/0146312 A1* | 6/2008 | Yamazaki et al. | 463/20 |
| 2008/0311969 A1 | 12/2008 | Kay et al. | |
| 2009/0061971 A1 | 3/2009 | Weitzner et al. | |
| 2009/0163276 A1* | 6/2009 | Inubushi et al. | 463/36 |
| 2009/0165632 A1* | 7/2009 | Rigopulos et al. | 84/609 |
| 2010/0029386 A1 | 2/2010 | Pitsch et al. | |
| 2010/0087240 A1 | 4/2010 | Egozy et al. | |
| 2010/0087258 A1* | 4/2010 | Moriwaki | 463/43 |
| 2010/0151948 A1* | 6/2010 | Vance et al. | 463/43 |
| 2010/0199228 A1 | 8/2010 | Latta et al. | |
| 2010/0248832 A1* | 9/2010 | Esaki et al. | 463/36 |
| 2010/0257993 A1 | 10/2010 | Brow et al. | |
| 2010/0300267 A1 | 12/2010 | Stoddard et al. | |
| 2010/0300269 A1 | 12/2010 | Applewhite | |
| 2010/0300270 A1 | 12/2010 | Applewhite et al. | |
| 2010/0304811 A1 | 12/2010 | Schmidt et al. | |
| 2010/0304863 A1 | 12/2010 | Applewhite et al. | |
| 2011/0003638 A1* | 1/2011 | Lee et al. | 463/35 |
| 2011/0034247 A1* | 2/2011 | Masuda et al. | 463/35 |
| 2011/0077080 A1 | 3/2011 | Meer | |
| 2011/0111846 A1* | 5/2011 | Ciarrocchi | 463/30 |
| 2011/0185309 A1 | 7/2011 | Challinor et al. | |
| 2011/0237330 A1* | 9/2011 | Asami | 463/31 |
| 2011/0248837 A1* | 10/2011 | Israr et al. | 340/407.1 |
| 2011/0256929 A1 | 10/2011 | Dubrofsky et al. | |
| 2011/0271187 A1 | 11/2011 | Sullivan et al. | |
| 2011/0298798 A1 | 12/2011 | Krah | |
| 2011/0306396 A1 | 12/2011 | Flury et al. | |
| 2011/0306397 A1 | 12/2011 | Fleming et al. | |
| 2011/0306398 A1* | 12/2011 | Boch et al. | 463/7 |
| 2012/0094730 A1* | 4/2012 | Egozy | 463/7 |
| 2012/0122580 A1* | 5/2012 | Asami | 463/37 |
| 2012/0129604 A1* | 5/2012 | Hayasaka et al. | 463/37 |
| 2012/0135806 A1* | 5/2012 | Nakano et al. | 463/36 |
| 2012/0237114 A1* | 9/2012 | Park et al. | 382/154 |
| 2012/0276995 A1* | 11/2012 | Lansdale et al. | 463/31 |
| 2012/0295705 A1* | 11/2012 | Hanawa | 463/31 |
| 2013/0023343 A1* | 1/2013 | Schmidt | 463/35 |
| 2013/0072301 A1* | 3/2013 | Mallinson | 463/36 |
| 2013/0113826 A1* | 5/2013 | Miyazaki | 345/632 |
| 2013/0135223 A1* | 5/2013 | Shai | 345/173 |

* cited by examiner

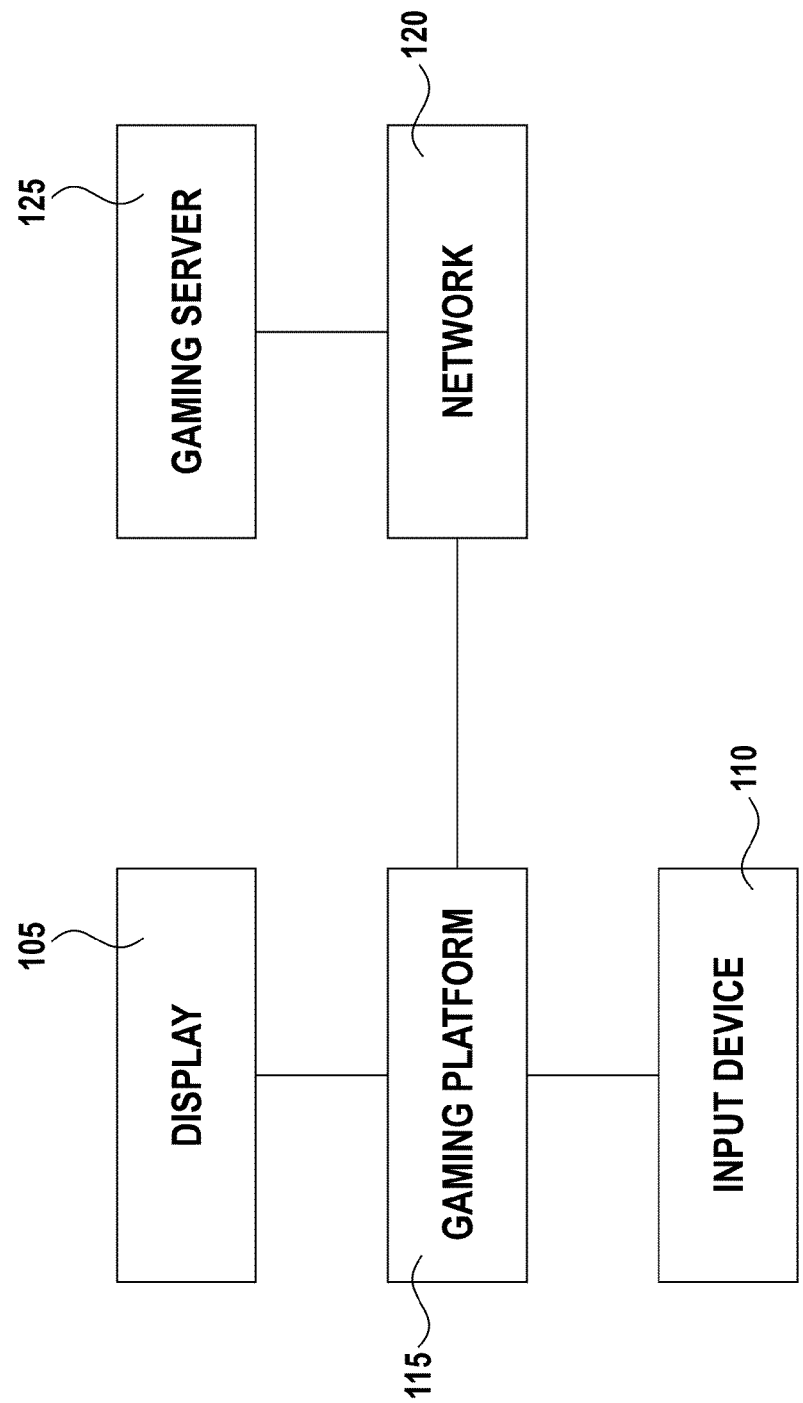

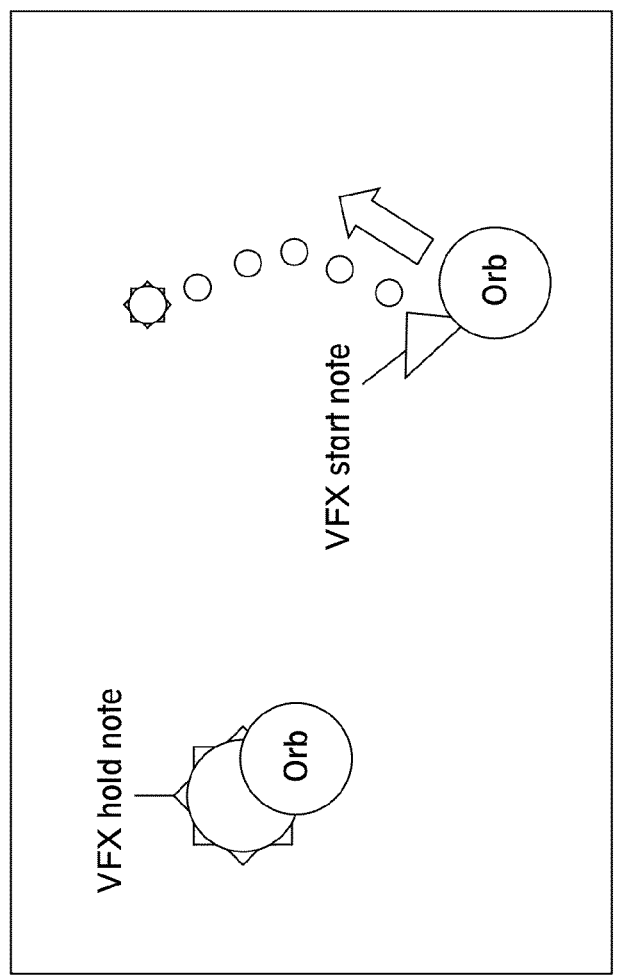
FIG. 5G

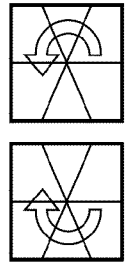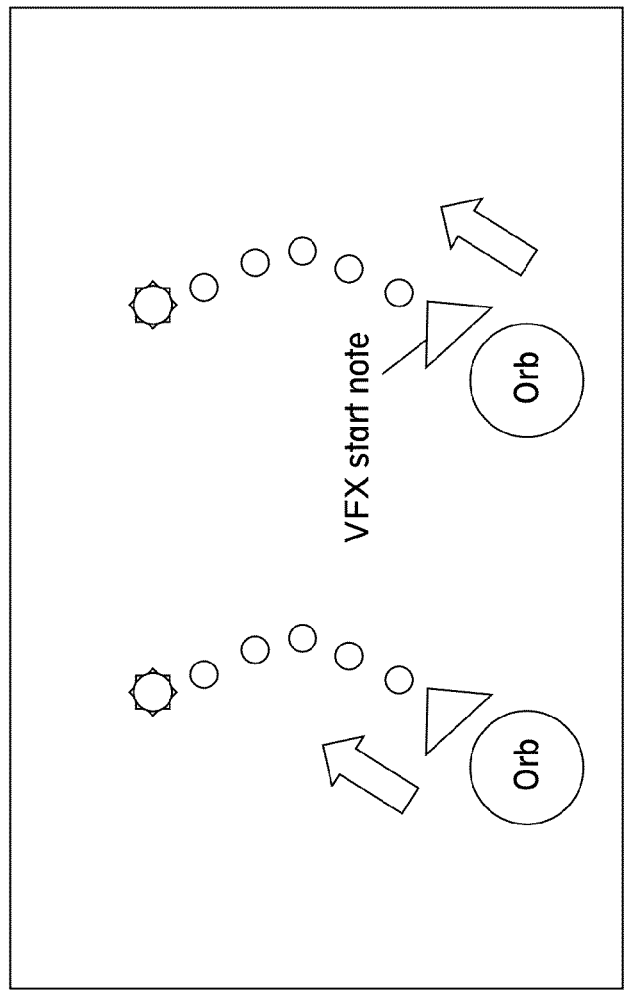
FIG. 5H

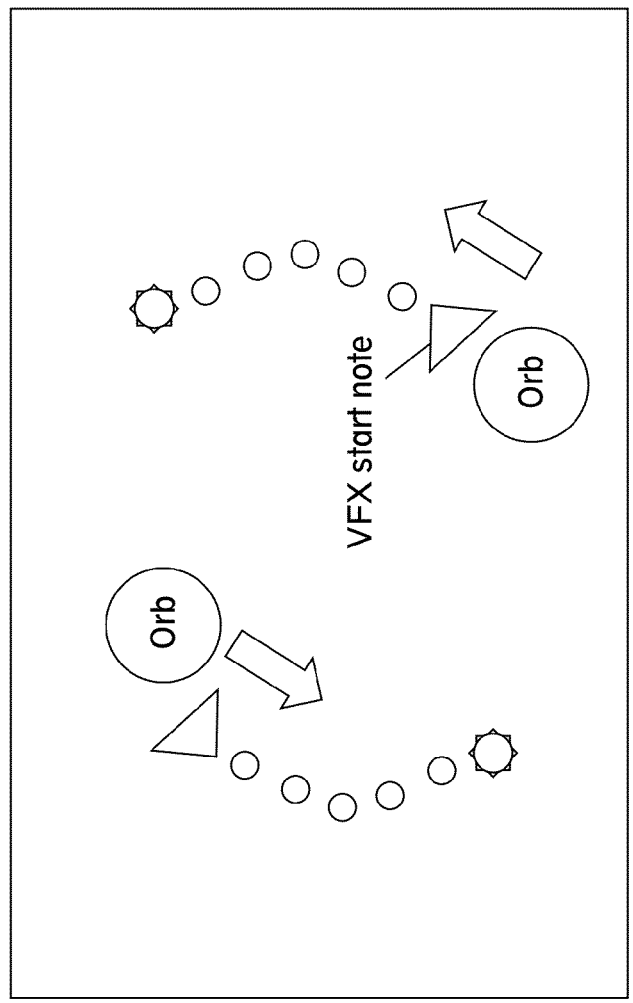
FIG. 5I

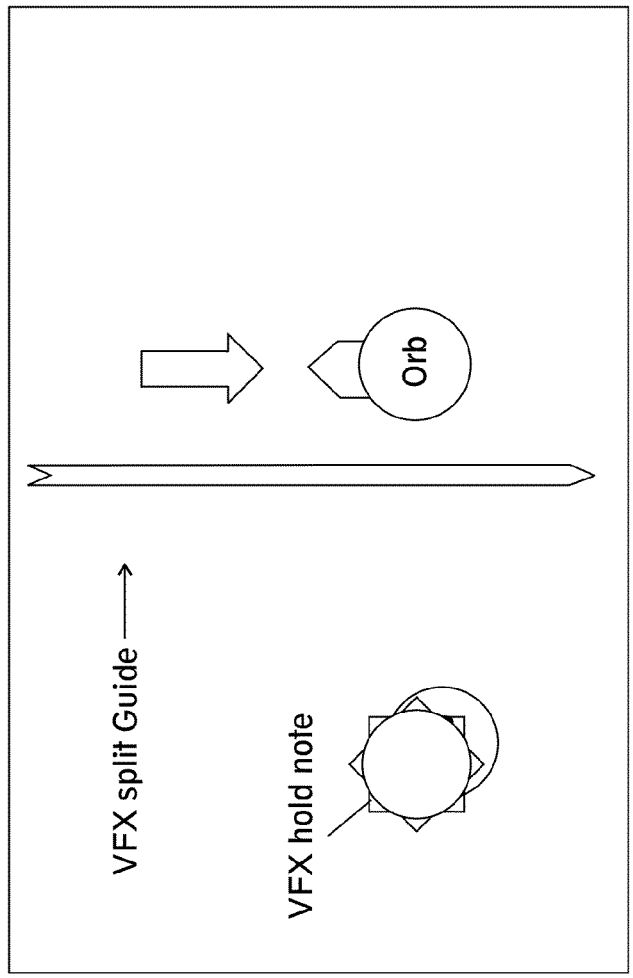

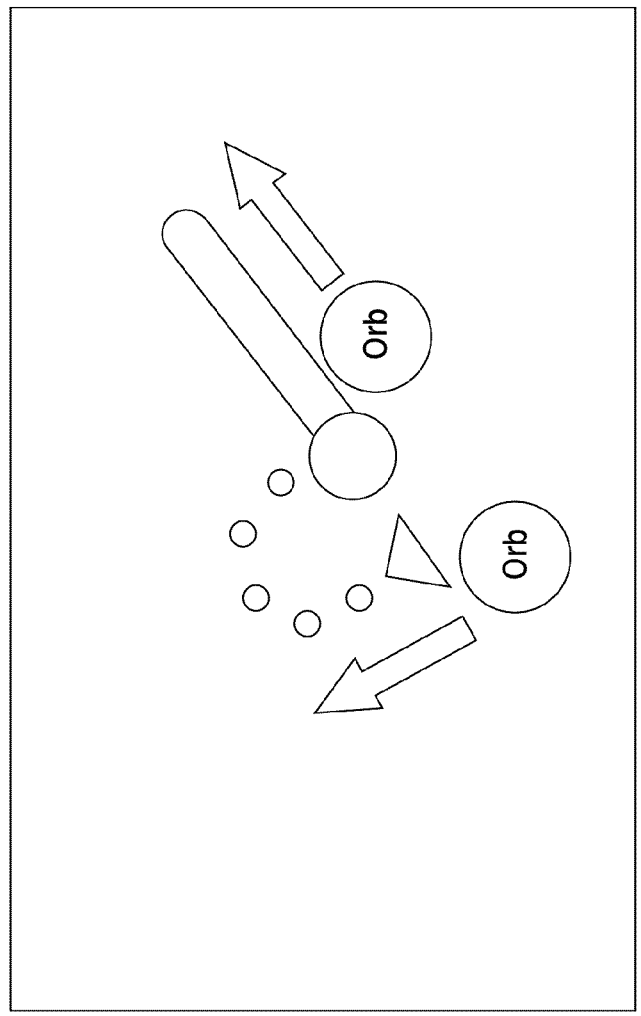
FIG. 5P

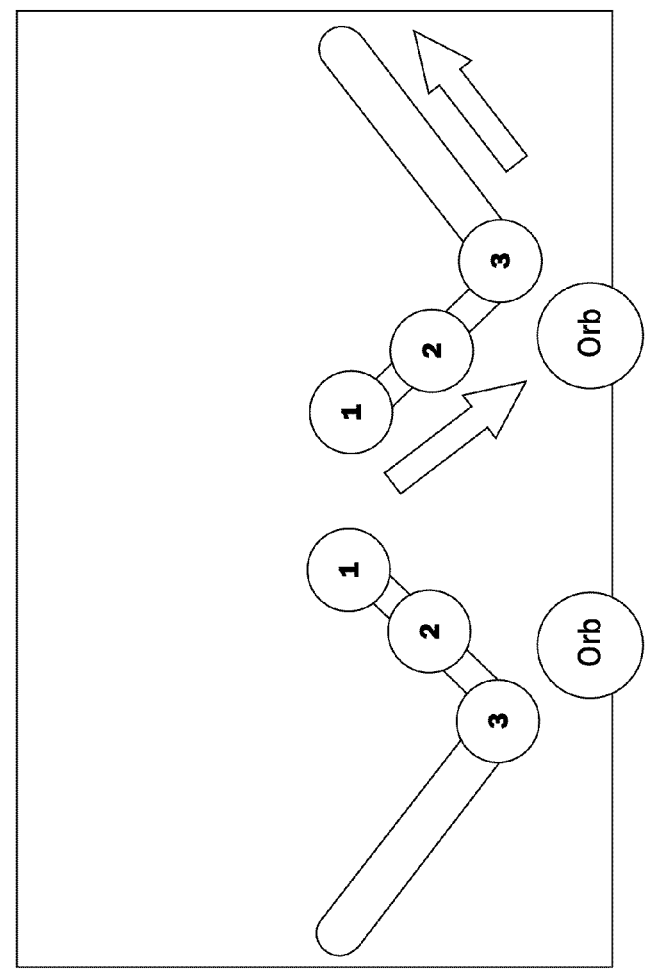
FIG. 5Q

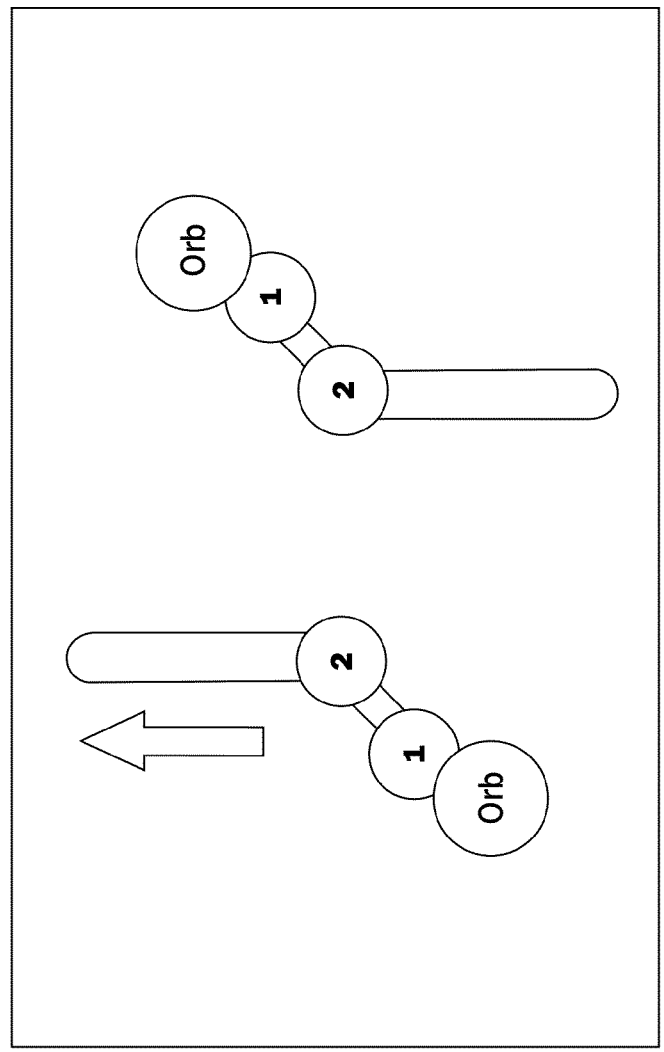
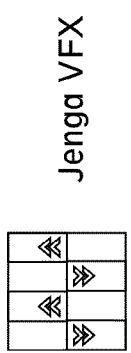
FIG. 5R

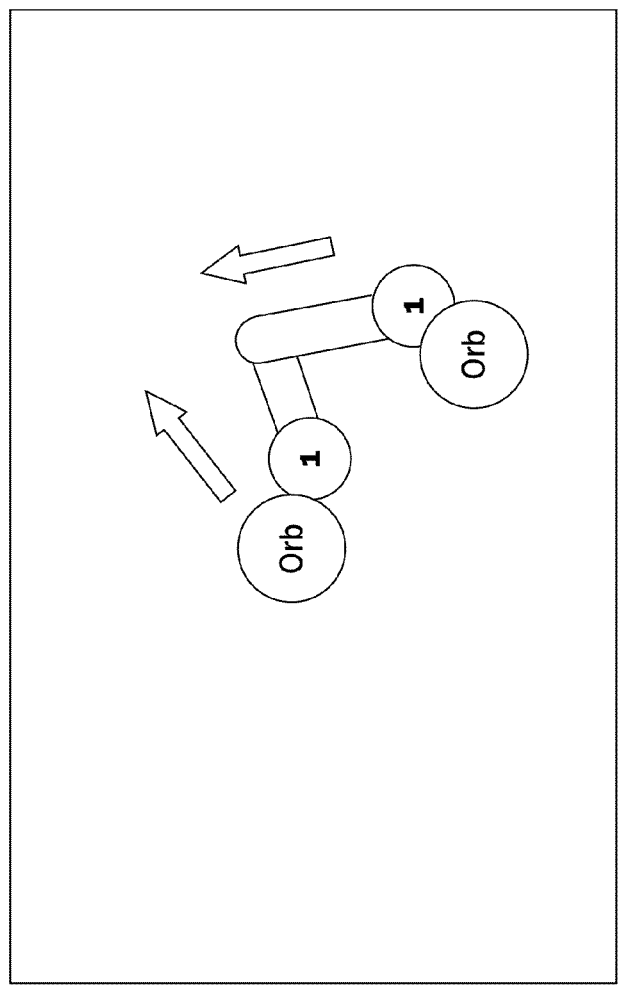
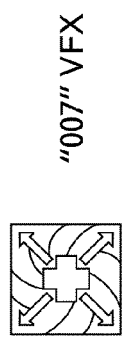
"007" VFX
FIG. 5U

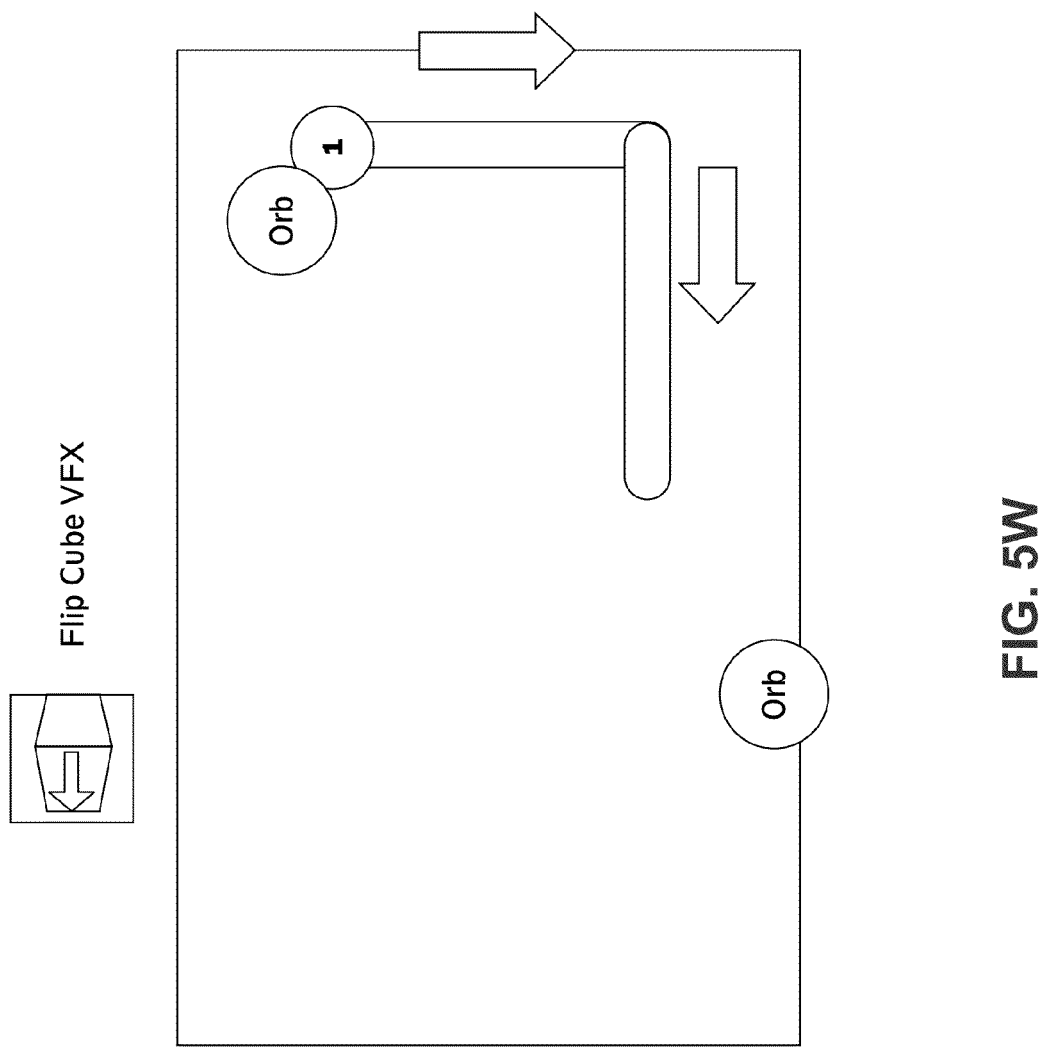

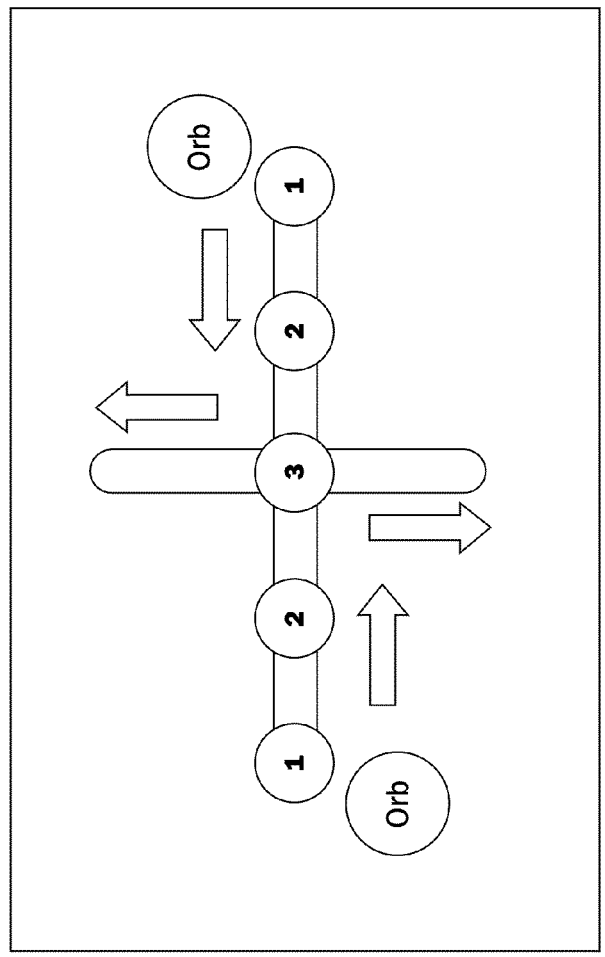
FIG. 5Y

INTERACTIVE MUSIC GAME

FIELD

The devices, systems and methods described herein relate generally to video games, and more particularly, to music-themed and/or rhythm-action games whereby the player can interact with music videos and/or individual songs or tracks.

BACKGROUND

Music video games often involve gameplay oriented around the player's interactions with musical tracks or songs. Some focus on dancing and require dance mats or dance pads. Some are known as "rhythm-action" games, which typically involve a player performing musical segments or phrases from an assigned, pre-recorded musical composition using an input device shaped like a musical instrument, such as a guitar. Examples of rhythm-action games include the GUITAR HERO® and ROCK BAND® series of games. GUITAR HERO® uses a guitar-shaped peripheral to simulate the playing of music, represented on a screen by colored notes that correspond to fret buttons on a controller. Similarly, ROCK BAND® also uses peripherals fashioned after musical instruments (e.g., microphone and a simplified drum set) to simulate the performance of music. Players "play" these instruments in time with musical "notes" that scroll on a screen.

Playing a video game with game controllers like joysticks with numerous buttons or music-instrument-shaped peripherals with "fret buttons" and "whammy bars" may be confusing and intimidating for players who are casual gamers or who are not familiar with music video games in general. In addition, these peripherals take a lot of space and are often single-use controllers. For example, dance mats are specialized for dance games and guitar peripherals can normally only be used in conjunction with the GUITAR HERO® and ROCK BAND® type of games. In view of the foregoing, it would be desirable to have methods, systems, computer program products, and/or devices that can offer a music game experience that is immersive and appealing to casual gamers, while taking advantage of a controller system that is intuitive and compatible with multiple games and functions.

SUMMARY

The methods, systems, computer program products, and devices described herein relate to music video games wherein one or more players interact with in-game dynamics associated with music that allow for immersive and customizable gameplay.

One embodiment is directed to a system that includes a gaming platform in electrical and/or signal communication with various components, including a display, an input device, and an audio output system. The software running on the gaming platform coordinates the operation of the input device, the display and the output of audio signals wherein a player (or user, referred interchangeably herein) can interact, by means of the input device, with the graphics and music associated with a music video playing within the user interface depicted on the game screen. The player's interactions can alter the song or music video during gameplay, which can be recorded and stored in a memory of the gaming platform.

In some aspects of the embodiment, the input device comprises a camera-based, motion-tracking sensor system that eliminates the need for, or use of, a typical joystick or game controller for input. The sensor can track the movements and positions of the player and map such movements and positions to a virtual space in the game or to other predetermined functions. In another aspect, there are alternative methods and devices that provide means for controlling in-game elements in a music video game, such as a mouse, trackball, keyboard, touchscreen, or a gaming console controller (e.g., an analog-stick controller, a joystick, the WII® remote, or the Sony Playstation MOVE® controller).

Some implementations of the methods, systems, computer program products, and devices herein provide additional or alternative functionality. For example, the movement of the player's hands can translate to movement of two corresponding Orbs in a virtual three-dimensional space of a rhythm-action music game. According to an exemplary embodiment, a music video plays in the background and the player is instructed to manipulate the Orbs to perform certain actions as mandated by a set of visual data (or game elements designated as "Sound Notes") that are associated with music phrases or segments. As the player continues to interact with the Sound Notes, he or she is rewarded with the ability to use special effects, designated as "VFX." Activation of a VFX can result in a change in appearance of the music video, as well as an alteration in the music. During the gameplay, a player is able to edit and customize a music video in real-time that he or she can save and share with the world.

In some aspects, the Sound Note system described herein creates a challenging and immersive experience by presenting to the player various "mini-games" that are accompanied by music. One way to conceptualize "mini-games" in this context is to view them as particular sets of instructions to move one or more Orbs to certain places at certain times. The player is instructed to "hit" the Sound Notes by completing their corresponding mini-games as they fly toward the screen in a virtual three-dimensional space. In a preferred embodiment, a Sound Note is associated with a particular sound or music segment, and comprises both a three-dimensional graphical representation of the Note (e.g., a comet) moving toward the player and a "Sound Note Cue" that appears at the front of the game screen. As the "comet" collides with the Note Cue, the player is encouraged to move an Orb over the Note Cue at the time of impact and may be instructed to further manipulate the Orb to complete the "mini-game" and finish "hitting" the Note. The speed of the Sound Notes can vary, as well as the location of the Sound Note Cues and the path taken by each Sound Note through the virtual space. Multiple Sound Notes may also appear on the screen at the same time. Thus, "hitting" the various Sound Notes requires hand-eye coordination as the player manipulates the Orbs to place them in different parts of the screen at different time intervals.

In another aspect, the music associated with each Sound Note adds a layer of complexity to the gameplay. A Sound Note can be associated with particular sounds or music segments, so whether the player is successful in "hitting" that Sound Note can affect how the music video sounds or is displayed. In case of a "miss" (or a failed attempt at the mini-game), such an event may result in a muted music segment, or an altered sound or image. Some Sound Notes may offer a choice for the player with respect to completing the mini-game. Depending on the choice taken by the player, the resulting effect may change the music video in a different way.

In yet another aspect, the challenge of gameplay is elevated through the implementation of an "aura" system. Aura emanates from the Orb and acts as the Orb's energy. As the player moves the Orbs around, the aura inside each Orb follows in a trail of light. In a preferred embodiment, the trailing aura limits the movement of the Orb because the Orb becomes immobile once too much aura is left behind. At this point, the player must wait for the aura to "catch up" in order to move the Orb again.

In combination with other features described herein, an alternative embodiment can include a VFX System. The VFX system contains a variety of special effects that work in conjunction with the music video, and is preferably powered by an Effects Gauge. If the player does well in the main Music gameplay in hitting Sound Notes, then he/she is rewarded with an ability to activate certain special effects at his/her choosing.

In some embodiments, the VFX can only be activated if the player performs and successfully completes a secondary set of "mini-games" in the form of Guide Notes. In one aspect, one or more Guide Notes will appear on the screen with a timer after the player selects a VFX. The player is directed to move the Orbs as instructed by the Guide Notes before the timer expires. If the player is able to perform the Guide Notes within the time specified, then the music video will be edited with the selected VFX for a short amount of time.

In some versions of the methods, systems, computer program products, and devices for dynamically displaying and customizing a music video in a rhythm-action game, the music video can be customized by multiple VFX effects and saved in a memory medium in use with the gaming platform. The video can be uploaded to a game server and stored in a central location, where it may be downloaded by other players having access to the server over the Internet.

Of the various features described, the methods, systems, computer program products, and devices herein offer a number of advantages in their operation and ability to offer customizable and non-linear gameplay. Other systems, methods, features and advantages will be or will become apparent to one with skill in the art upon examination of the following figures and detailed description. It is intended that all such additional systems, methods, features and advantages be included within this description, be within the scope of the devices, systems and methods described herein, and be protected by the accompanying claims.

BRIEF DESCRIPTIONS OF THE DRAWINGS

The figures provided herein are not necessarily drawn to scale, with some components and features being exaggerated for clarity. Each of the figures diagrammatically illustrates aspects of the embodiments.

FIG. 1B is a block diagram showing a gaming platform for running game software and various components in communication with the gaming platform.

DETAILED DESCRIPTION

The devices, systems and methods described herein can be used to provide an interactive environment while enhancing the musical gaming experience of one or more players.

Figure 1A:
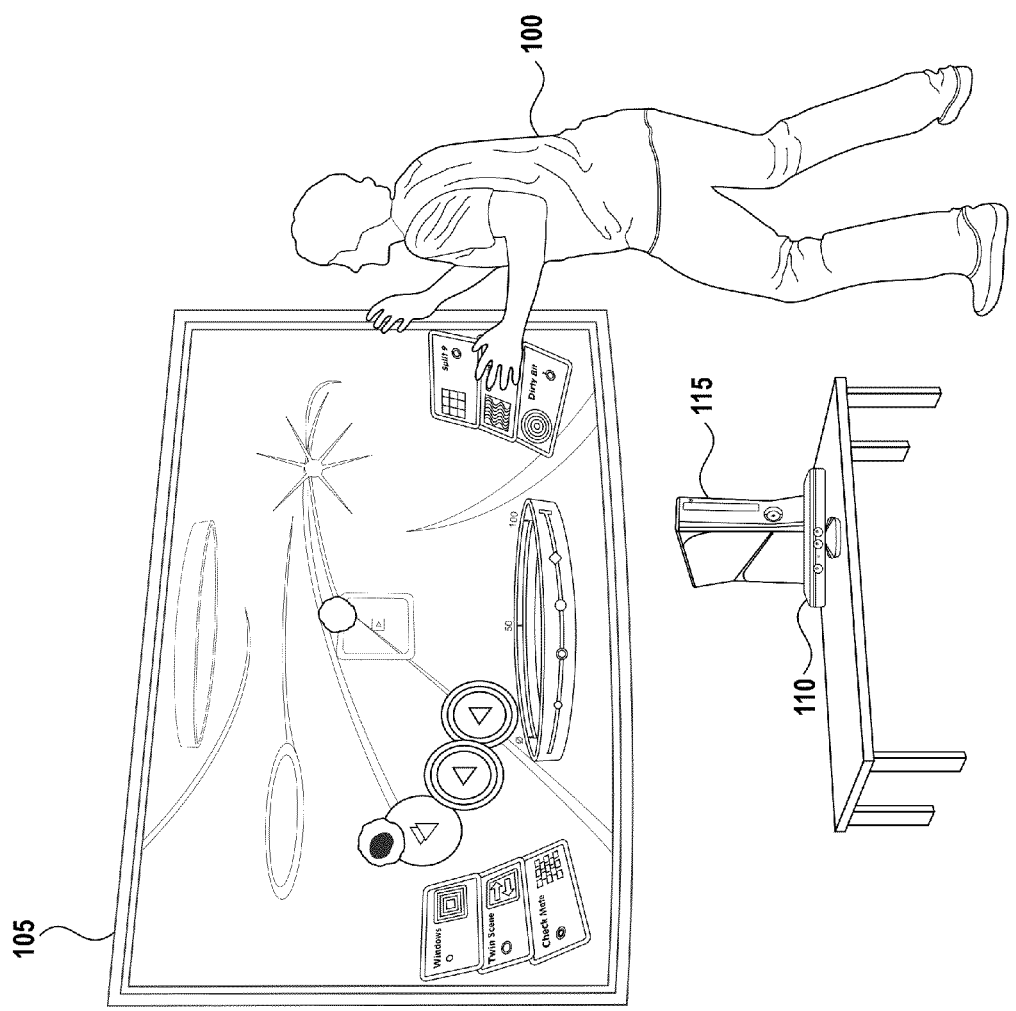
FIG. 1A illustrates a perspective view of a player interacting with a system including a gaming platform, a display, and a motion tracking system according to an embodiment.

FIG. 1A depicts a preferred embodiment of how the devices, systems and methods described herein can be used. As shown in FIG. 1A, a player 100 is able to have an interactive experience with music and motion video graphics displayed on a screen 105 simply by moving his/her hands and arms in accordance to the music and the musical cues. A sensor system 110, which is connected to a gaming platform 115, tracks the player's movements and provides feedback that is processed by the gaming platform 115 and reflected on the screen 105.

FIG. 1B is a high-level block diagram showing a gaming platform for running game software and various components in signal communication with the gaming platform. According to some embodiments, the gaming platform 115 is a dedicated game console, such as XBOX 360® manufactured by Microsoft Corp., PLAYSTATION 3® manufactured by Sony Corporation, or WII® manufactured by Nintendo Corp. In other embodiments, the platform 115 can also be a personal computer, laptop, tablet computer, or a handheld mobile device. One or more players can use a gaming platform to participate in a game. Multiple gaming platforms may be linked together locally (e.g., via a LAN connection), or via the Internet or other communication networks. In a preferred embodiment, the gaming platform 115 is connected via the Internet 120 to a game server 125 that can host multiplayer games and various gaming information (e.g., custom music videos created by players, scores, and rankings) that can be accessed by the player when he or she is online. Reference herein to gaming platforms may, for some implementations, be read as gaming platforms with game software executing on it, such that the omission of reference to the game software does not imply absence of the game software. In some embodiments, game software alone may embody the invention (e.g., a computer program product, tangibly embodied in a computer-readable storage medium), while in some embodiments the invention is implemented in hardware, or a combination of hardware and software.

The gaming platform 115 is typically in electrical and/or signal communication with a display 105. The display 105 can be a television, a computer monitor, or the screen on a tablet computer or mobile device. The gaming platform 115 is also typically in electrical or signal communication with one or more controllers or input devices. In FIG. 1B, an input device 110 is shown in communication with the gaming platform. In a preferred embodiment, an interactive-motion-tracking system, such the Xbox 360 KINECT® device, is used to track the movements of a player within a 3-dimensional physical space. The sensor 110 provides data signals to the gaming platform 115, which processes the data and translates the player's movements on the display. The gaming platform 115 can also perform various calculations or operations on inputs received by the sensor and instruct the display to provide a visual representation of the inputs received as well as effects resulting from subsequent operations and calculations.

Some embodiments of the gaming platform 115 contain hardware and/or software, such as a central processing unit, audio processor(s), graphic processor(s), and storage device(s), that perform general or specific tasks. The gaming platform or the display itself is also preferably in communication with an audio output system for making sounds audible.

Gameplay

Figure 2:
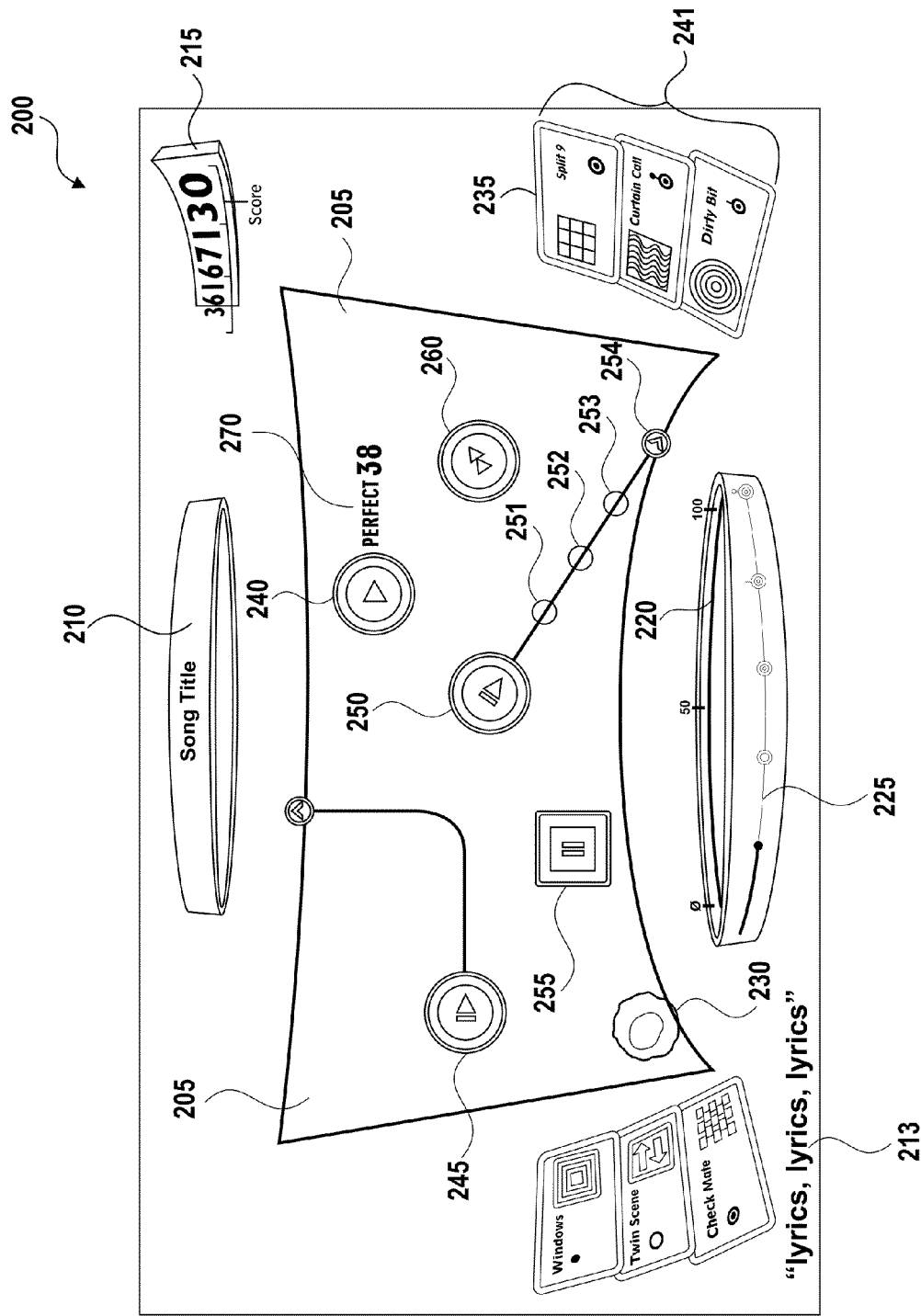
FIG. 2 shows an exemplary graphical user interface of a music video game in which an interactive motion-tracking system can be used.

Referring to FIG. 2, one embodiment of a graphical user interface (GUI) of a music video game in which an interactive motion-tracking system can be used is shown. In a preferred embodiment, the player is presented with a GUI 200 that includes a music video 205 playing in the background, a music or song title 210 associated with the video, lyrics 213 associated with the music video, a score indicator 215, a health gauge 220, an Effects Gauge 225, one or more floating "Orbs" 230, one or more special video effects ("VFX") icons 235 in a VFX panel 241 related to the VFX system, and one or more "Sound Note Cues" 240, 245, 250, 255, 260 related to the "Sound Note" system.

The music video 205 can be enhanced with various types of graphics or special effects during gameplay. For example, in addition to the main music video 205, a series of duplicate video images may stream across the screen simultaneously. In another embodiment, the music video 205 can pulsate visually with certain rhythm or beats to enhance the feel of gameplay and accentuate portions of the song. Lyrics 213 and other designated textual phrases can also accompany the display of the music video 205. In addition, as described in more detail below, during the "Music Video VFX mode," one or more special effects can be applied to the music video to allow for customization and further augment the game experience.

According to an exemplary embodiment, the gameplay system can be divided into two main types: (1) Music and (2) Music Video VFX. In the Music Gameplay, the player controls two "Orbs" to interact with the music and "Sound Notes." Each "Sound Note" may be associated with a music segment, and may require the Orbs to be moved or manipulated in a particular way. As the player continues to interact with the Sound Notes, he or she is rewarded with the ability to use special effects ("VFX") as measured by the Effects Gauge. Some effects may require the Effects Gauge to be filled to a certain threshold level before the player can activate them. In one embodiment, activation of the VFX pauses the main Music Gameplay and transitions into the Music Video VFX Gameplay, providing the player with an ability to enhance the music video. For example, the player can choose and use a "VFX," which produces a special effect that changes the music video. In order for the VFX to take effect, the gameplay may shift into a motion-based mini-game. Some aspects of the embodiment are designed to take full advantage of motion sensing systems, such as the Microsoft Xbox 360 KINECT® hardware and technology system. Features that can be used in conjunction with the KINECT® system include motion tracking, head tracking, and voice technology.

Orbs System

One embodiment utilizes a construct called "Orbs" as the control system. An Orb can be represented as a moveable object (e.g., a floating sphere) in a three-dimensional virtual space depicted in the user interface. The player can control an Orb with each hand and manipulate them to interact and control the playing of the song or music video. For example, if an interactive-motion-tracking system (such as the KINECT® system) is used, the Orbs on the screen can move in conjunction with the player's hands as the hands are being tracked by the motion sensor. Alternatively, Orbs can also be controlled with other types of controllers, such as a mouse, trackball, keyboard, touchscreen, or a gaming console controller (e.g., an analog-stick controller, a joystick, the WII® remote, or the Sony Playstation MOVE® controller).

Figure 3A:
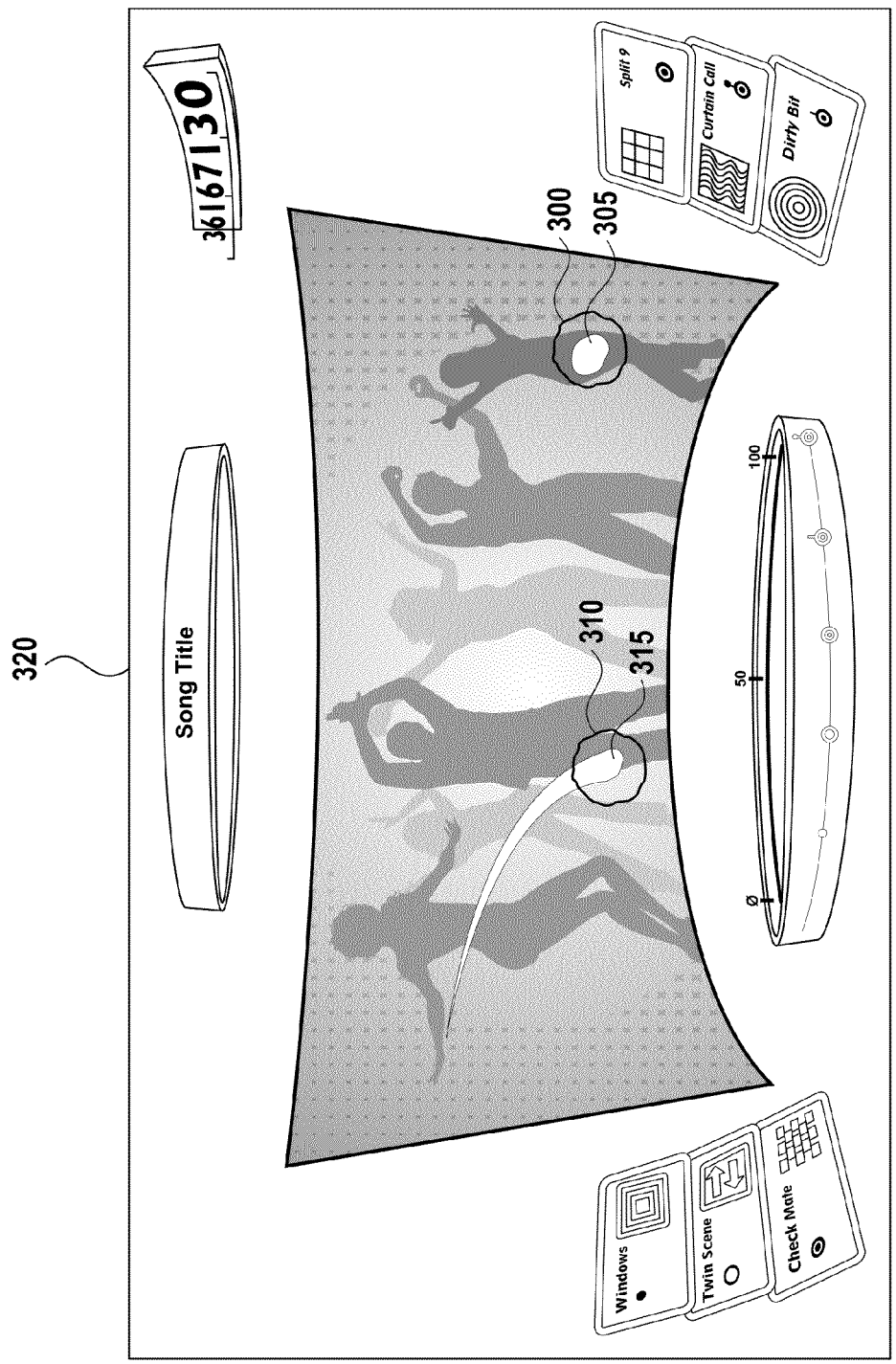
FIGS. 3A-3F are exemplary screenshots depicting progressive screen displays of an embodiment of a music video game.

As shown in FIG. 3A, two Orbs 300, 310 may appear in a Gameplay Zone 320 (e.g., a three-dimensional virtual space) simultaneously. In one embodiment, the player can control one Orb 300 with his/her right hand and the other Orb 310 with his/her left hand. When the player moves a hand in one direction, the corresponding Orb will respond by moving in the same direction. Each Orb 300, 310 may also have an "aura" 305, 315, which is an energy and movement indicator. Aura emanates from the Orb and acts as the Orb's energy. As the player moves the Orb 310 around, the aura 315 inside the Orb 310 leaves a trail of light. Once aura 315 is depleted from the Orb 310, the player will be unable to move the Orb 310 until the aura 315 goes back inside. In a preferred embodiment, the player can only move the Orb if there is aura in it. When the player controls the Orbs by moving his/her hands around, an aura will follow each Orb and may trail behind depending on how fast the Orb is moving. At this point, the Orb becomes immobile until it fills up with aura again. This restriction discourages the players from moving their hands in a frantic random motion while trying to hit the Notes and "cheat" for points. As a result, the aura system helps make the gameplay more challenging and more skill-based. As further explained in the Sound Notes section, using an Orb to hit a Sound Note accurately may fill the Orb with aura, which also helps create an incentive for the player to be more accurate in his/her gameplay.

Sound Note System

The Sound Note system acts as a guide for the player during the music interaction and gameplay. It generates visual cues that are associated with the music, rhythm and sounds from the music video playing in the main game screen, and allows the player to interact with them.

Figure 3B:
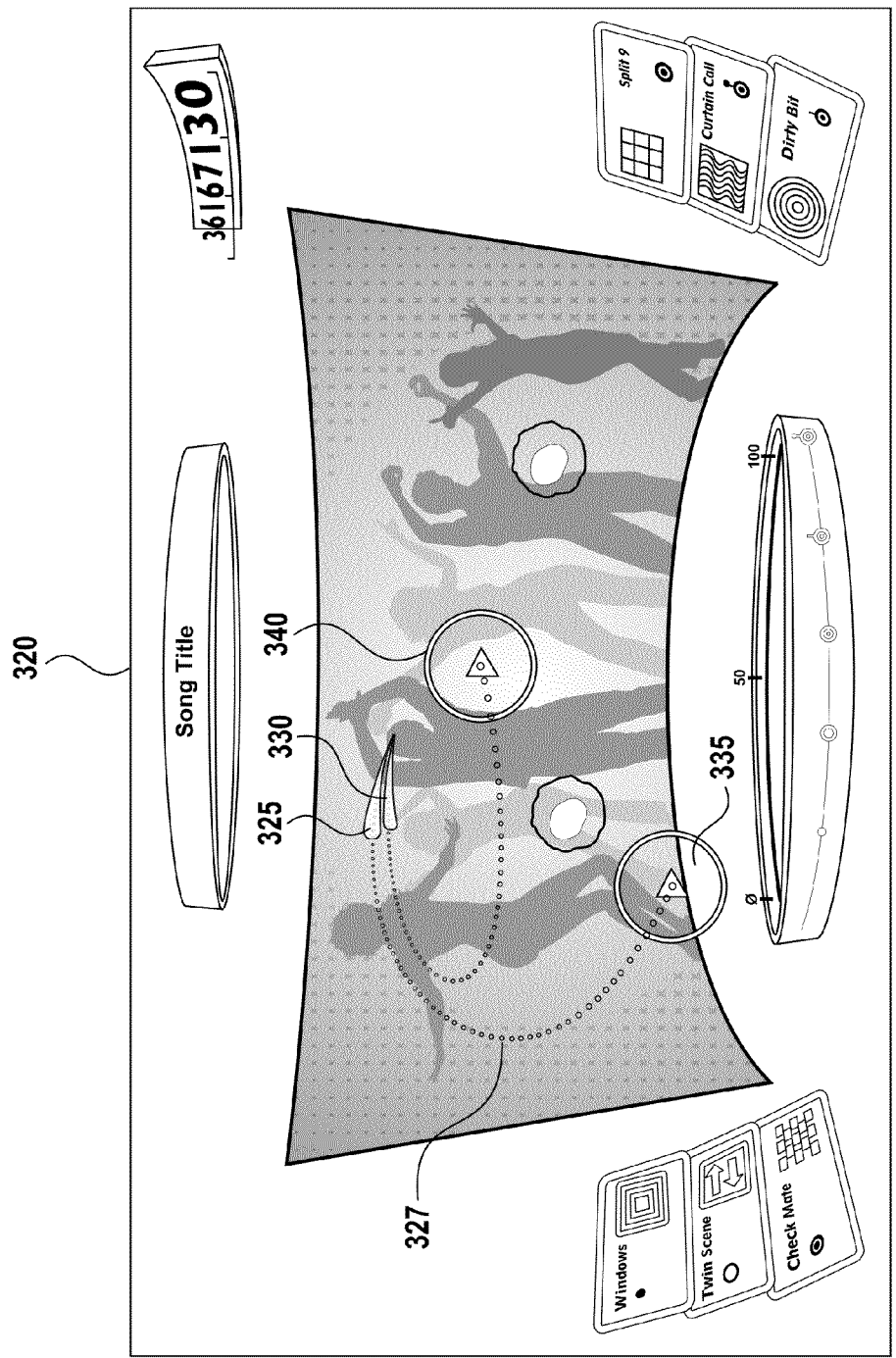

FIGS. 3B-3F provide an illustration of how the Sound Note system operates in a preferred embodiment. Referring to FIG. 3B, the Gameplay Zone 320 appears visually as a three-dimensional space (i.e., a virtual space displayed on a two-dimensional display screen) and Sound Notes 325, 330 appear as if they are moving from a distance from the back of the space toward the game screen in the front. At the same time, there is a corresponding Sound Note Cue 335, 340 for each Sound Note at the front of the screen indicating what type of Sound Note it is and the location of where it will ultimately impact the screen ("screen" is used interchangeably with the image plane of display facing the player). For some embodiments, the path 327, 329 along which each Sound Note travels is shown as small dots.

Figure 3C:
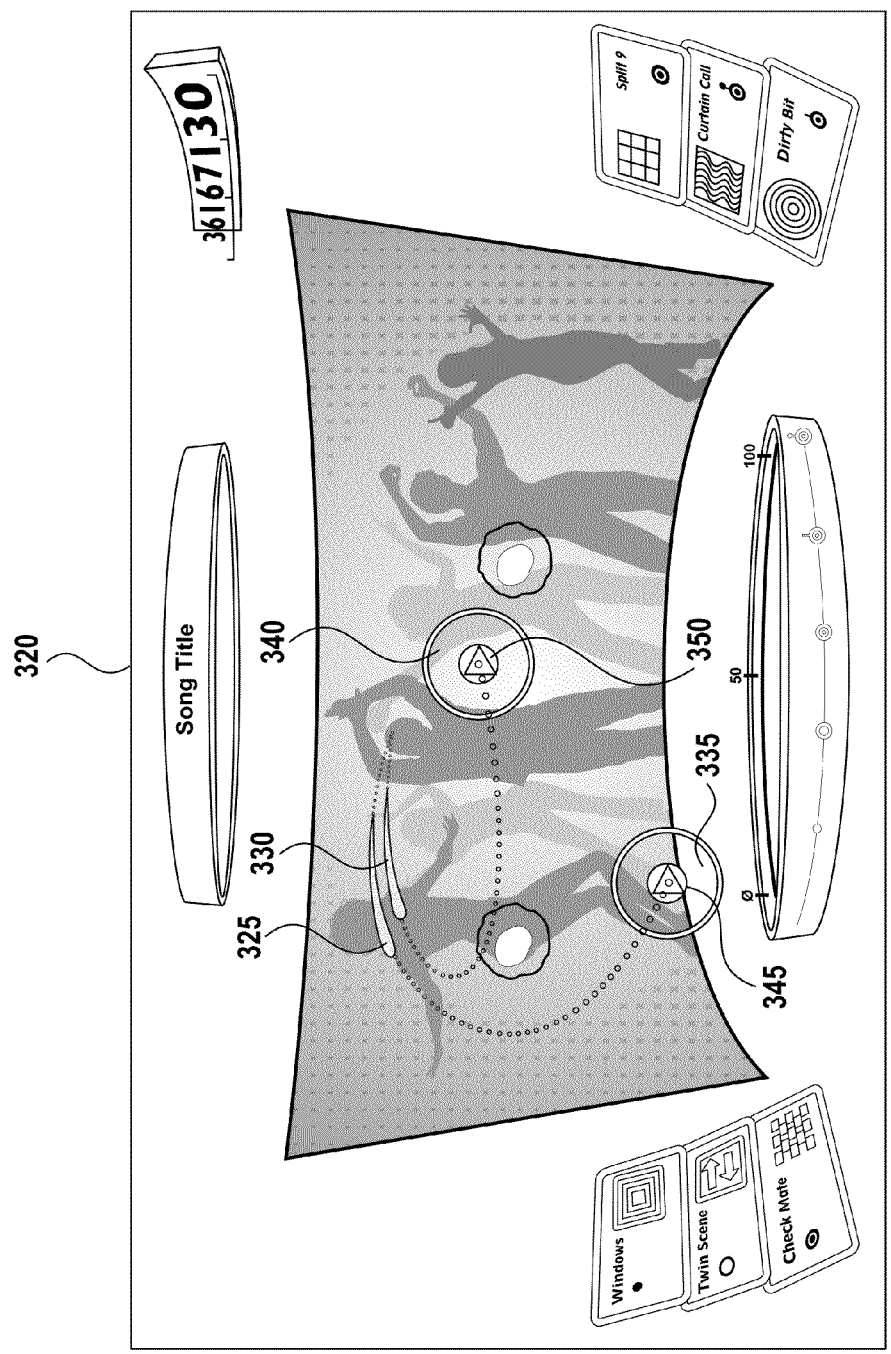
Figure 3D:
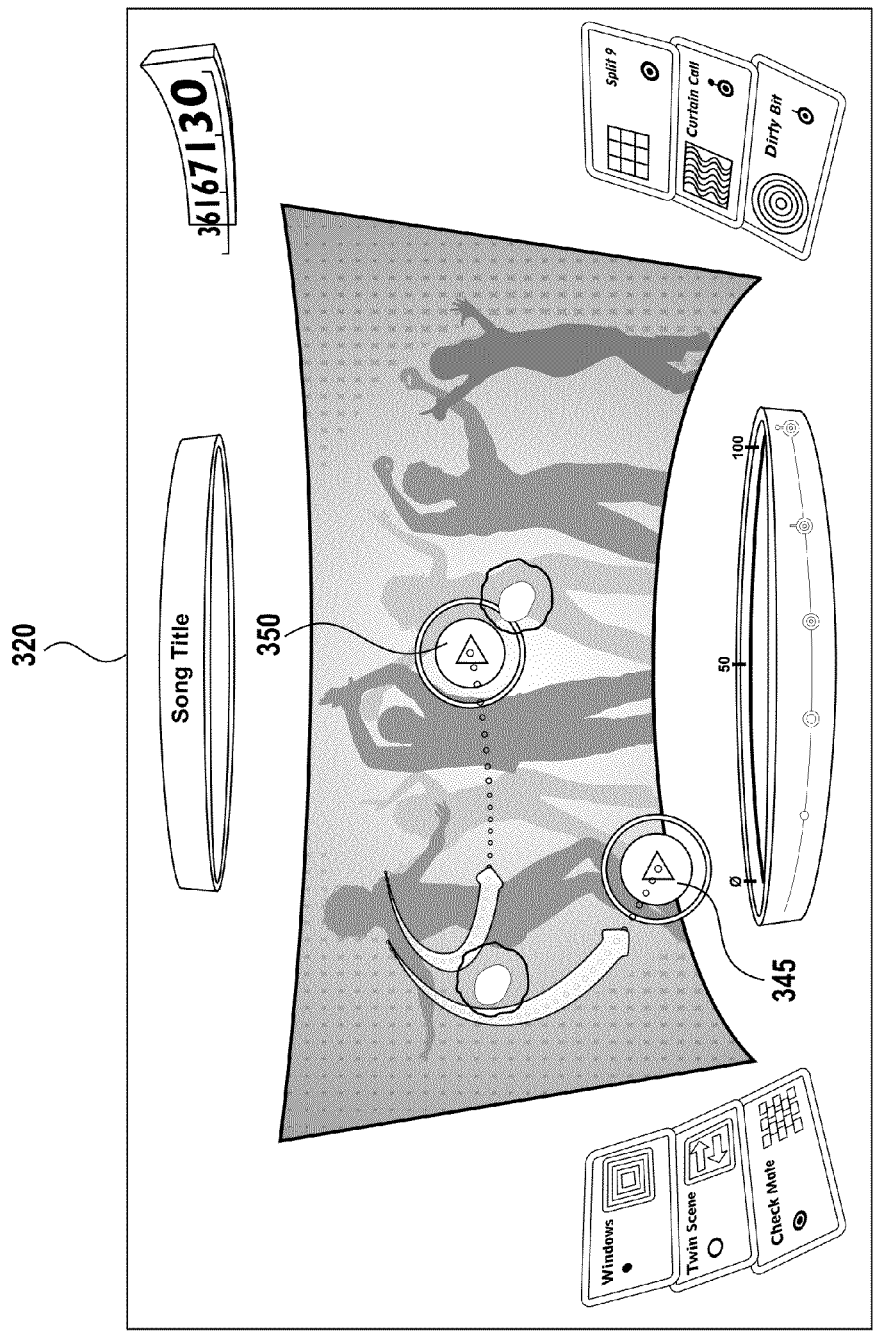
Figure 3E:
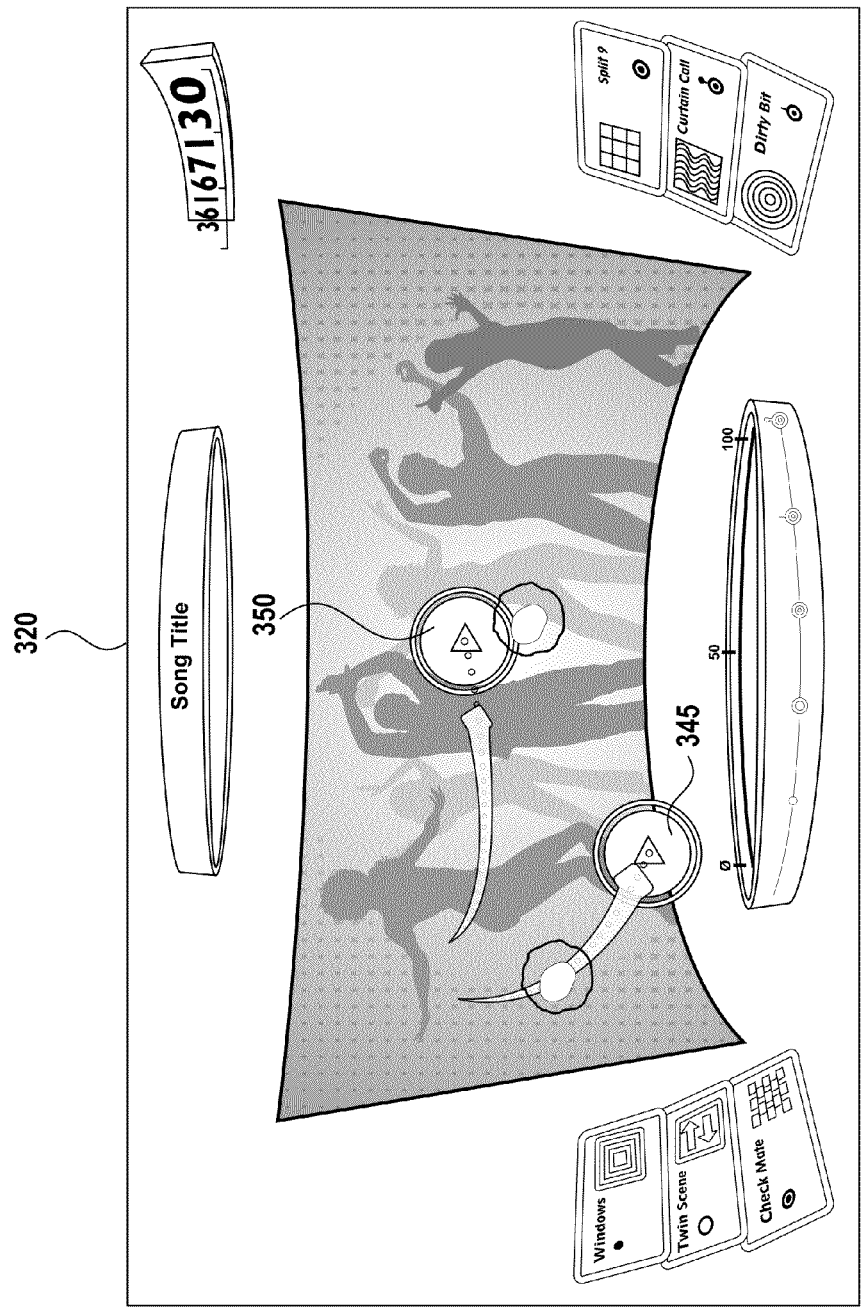

The timing of a Sound Note as it hits the screen can be tricky, because one Note may travel along a different path than another, the path may include one or more curves, and the three-dimensional aspect of the path taken can distort a player's sense of how fast the Note should arrive. For example, a Sound Note traversing in a lateral direction might appear to move faster than when it is moving toward the screen due to the effects of depth perception. FIGS. 3C-3E show an optional functionality that informs the player about the timing and progression of the Sound Notes as they move along the dotted paths toward the screen. According to one aspect, the progress of each Sound Note corresponds with a shading 345, 350 of the Sound Note Cues as shown in the figures (i.e., the shading is small when the Sound Notes are far away, but may fill the entire Sound Note Cue as each Sound Note impacts the screen).

In one embodiment, the perspective of the player as he or she views the GUI can be represented by a virtual camera in motion rather than a stationary view. For instance, the player may view the three-dimensional virtual space as though he/she is on the rails of roller-coaster (e.g., a "virtual track") or is flying through space. From the perspective of the player, he or she is traveling along a pathway in a three-dimensional universe, and the pathway may be straight or it may meander within such a universe. The Sound Notes can be displayed in such a way to provide the player with the appearance of motion either by the movement of the Notes themselves, by the movement of the virtual camera, or both.

Figure 3F:
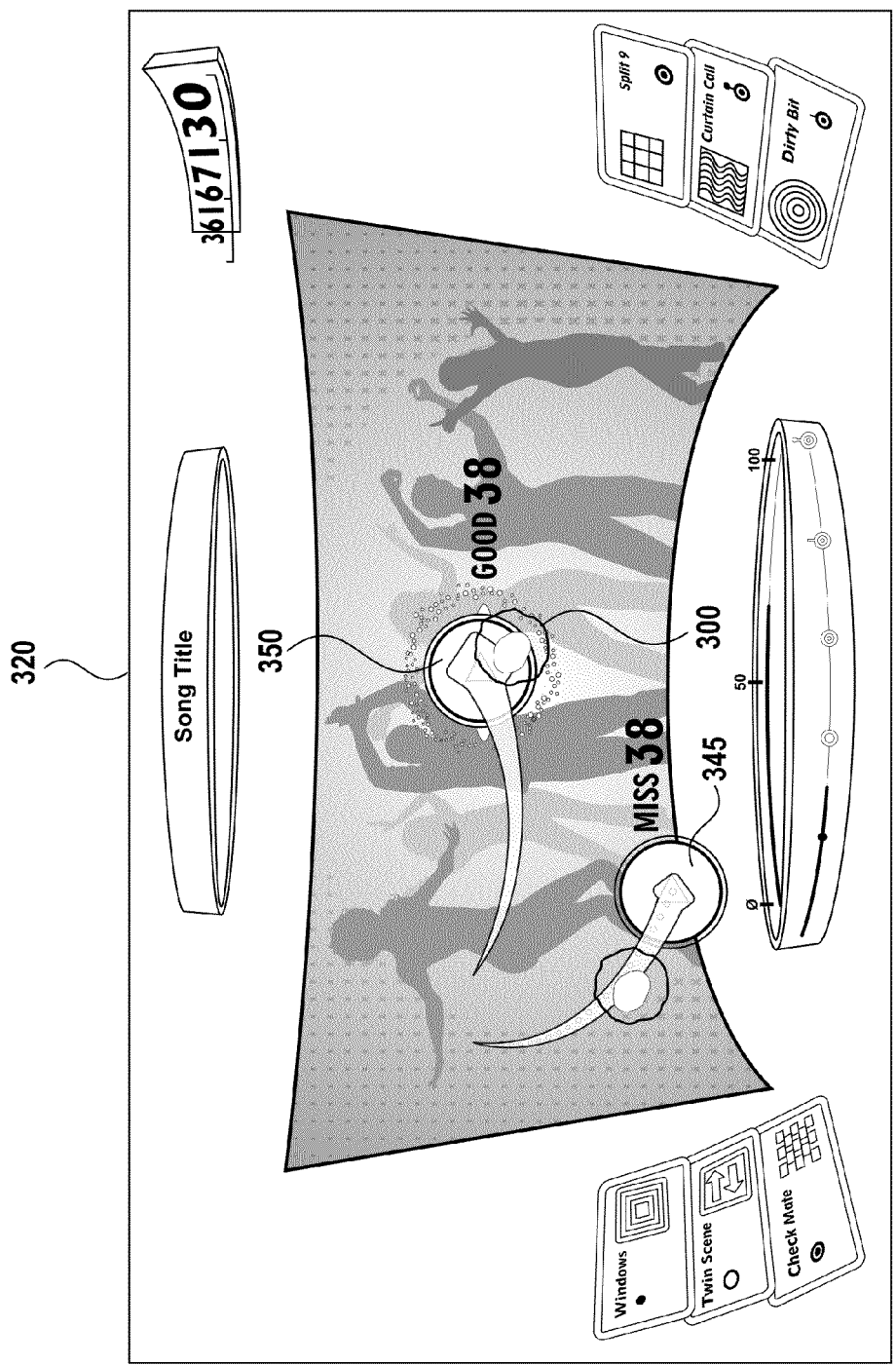

The success of gameplay is determined by the timing and the accuracy in placement of the Orbs in conjunction with the Sound Notes. If the Orb 300 overlaps with a Sound Note 350 as it impacts the screen, then the player is deemed to have "hit" the Sound Note. The closer the Orb is to the center of each Sound Note at the time of impact, the higher the score the player will receive. In one embodiment, if the Orb is in the center of the Sound Note at the time of impact, then the player is awarded a perfect score for that Sound Note, and the screen will display a "perfect" label next to the Note. If the Orb is in the vicinity of the note, but not quite in the middle, then the player will receive a medium score with a "good" label. If the Orb is outside of the Sound Note, then the player will receive a low (or zero or negative) score with a "miss" label, as illustrated in FIG. 3F. A player's score is determined in part by how well the player "hit" the Sound Note and the number of consecutive Sound Notes hit. In a preferred embodiment, the system will keep track of the number of consecutive Sound Notes that has been hit, and display such a number next to the rating labels, as shown in FIG. 3F.

To assist players in hitting the Sound Notes, several options can be implemented. For example, if the "magnet feature" is turned on, then the Orbs behave as though they have magnetic qualities with respect to the Sound Note Cues. That is, as long as an Orb is within a proximate vicinity of the Sound Note Cue when the Sound Note arrives, it will gravitate to the center of the Cue at the right moment so that the Player does not need to be as precise in his or her movements. In addition, the speed of the "virtual track" and the Sound Notes can also be adjusted to vary the difficulty of gameplay.

In one embodiment, hitting the Sound Notes can refill the Orbs with aura, which enables the player to move the Orbs more freely. Depending on whether the player hits a Note squarely in the center, he or she may be awarded different amounts of aura. Similarly, getting either a "good" or a "perfect" rating on a Sound Note will raise the "Effects Gauge" and the "Health Gauge," albeit in different increments. The Effects Gauge determines the player's ability to use VFX, which is described further below. The Health Gauge represents a player's in-game "health" and current standing. The player will be able to keep the gauge up by performing beats via hitting Sound Notes, but missing the Sound Notes entirely will cause the player's Health Gauge to drop. If a player's "health" drops all the way down, then the game ends.

The Sound Note system includes different types of Sound Notes, each with its own appearance, function and effect. In an exemplary embodiment, a Sound Note comprises both a graphical representation of the Note moving toward the player and a "Sound Note Cue" that appears at the front of the screen. Several examples of Sound Notes are illustrated below:

The Basic Note is a basic building block of the Sound Note system. It can represent a single sound or beat or more generally a single section of music. As illustrated in FIG. 3B, the Sound Note Cue 335 of the Basic Note 325 can be shown as a circle with a sideways triangle inside (e.g., a "play" button). To interact with this Sound Note, the player simply moves the Orb over the Sound Note Cue as the Sound Note hits the screen.

The Direction Note is another type of Sound Note, which can be associated with quick repeat sounds. As shown in FIG. 2, the Direction Note Cue 245 can be optionally represented as a circle with a triangle (or any other directional marker) along with an adjacent bar. When the player matches the Orb with the Direction Note, a movement path opens up and the player is instructed to move the Orb from one waypoint to one or more subsequent waypoints. For example, in FIG. 2, the player first moves the Orb 230 to the center of the Direction Note Cue 250 and then follows the direction of the Cue 250 to move the Orb 230 across one or more waypoints 251, 252, 253, 254. Another type of Direction Note might be used for scratch or deejay-style-related sounds, wherein the waypoints following the Direct Note are aligned in a zig-zag shape. Yet another type of Direction Note has a curved path between the main note and the waypoint. For example, the Direction Note Cue 245 for such a note is shown in FIG. 2. The player is instructed to hit the Note and then follow the path to the waypoint. These types of Notes might be used to control the pitch of the sound. For example, moving upwards may raise the volume and moving downwards may lower the volume. Moving in a wave shape may be associated with a distortion of the sound.

In one embodiment, the player can control the sound/music by moving the Orb in a particular manner and affecting the music or the sound accordingly. For example, a Direction Sound Note might offer two paths, and by following one path, the player changes the music in one way (e.g., higher sound volume), whereas following another path changes the music in another way (e.g., lower sound volume). In some aspects, the music only changes if and when the player decides to move the Orb in a certain way. In another embodiment, the music or sound is pre-determined and the player's movements will have no effect on it, even though the timing may be such that the player's movement and the change in music are happening at the same time.

The Hold Note can be associated with sustained sounds and repeat sounds and can be represented by a Cue 255 showing 2 vertical bars (e.g., "pause" button). When the Hold Note comes into contact with the Orb, the player is instructed to hold the Orb over the Cue until the note completely disappears. Consistent with this construct, the graphical representation of the Hold Note moving toward the player is preferably different than that of a Basic Note. In one embodiment, whereas a Basic Note might be represented as a comet-like object with a short tail, the Hold Note can be a comet-like object with a much longer tail, so that the time that a player has to hold the Note corresponds with the time that the Note comes into contact with the screen.

The Hit Note can be associated with strong sounds such as percussions, beats, drums, or other loud sounds. The Hit Note Cue 260 can be represented by a circle with a double triangle, as shown in FIG. 2. When a Hit Note comes into contact at the impact point of the screen, the player is instructed to hit this note with the Orb toward the direction that it is pointing. In another embodiment, the Hit Note can be performed by simply moving the Orb (regardless of the direction) across the Hit Note Cue as the Hit Note impacts the screen (i.e., the Orb is required to be in motion as opposed to being stationary during impact).

As described above, there may be multiple embodiments of the Sound Note system. According to one embodiment, the Sound Notes do not have to correlate to any sound or segment of the music video. The Notes can arrive and the players can hit the Notes without any interruption to the music flow. Another embodiment contemplates programming the music or the music video to be linked to the Sound Notes. In this case, if the player does not perform a Sound Note, then the music or the music video associated with that Sound Note will not be played. Yet another embodiment contemplates supplementing the music or music video with additional notes, beat sounds or other special effects. In such an embodiment, the main music video and the music will play regardless of actions by the player, but the player has the option of adding special effects or sounds to enhance the music/music video by performing the Sound Notes.

VFX System

Figure 4A:
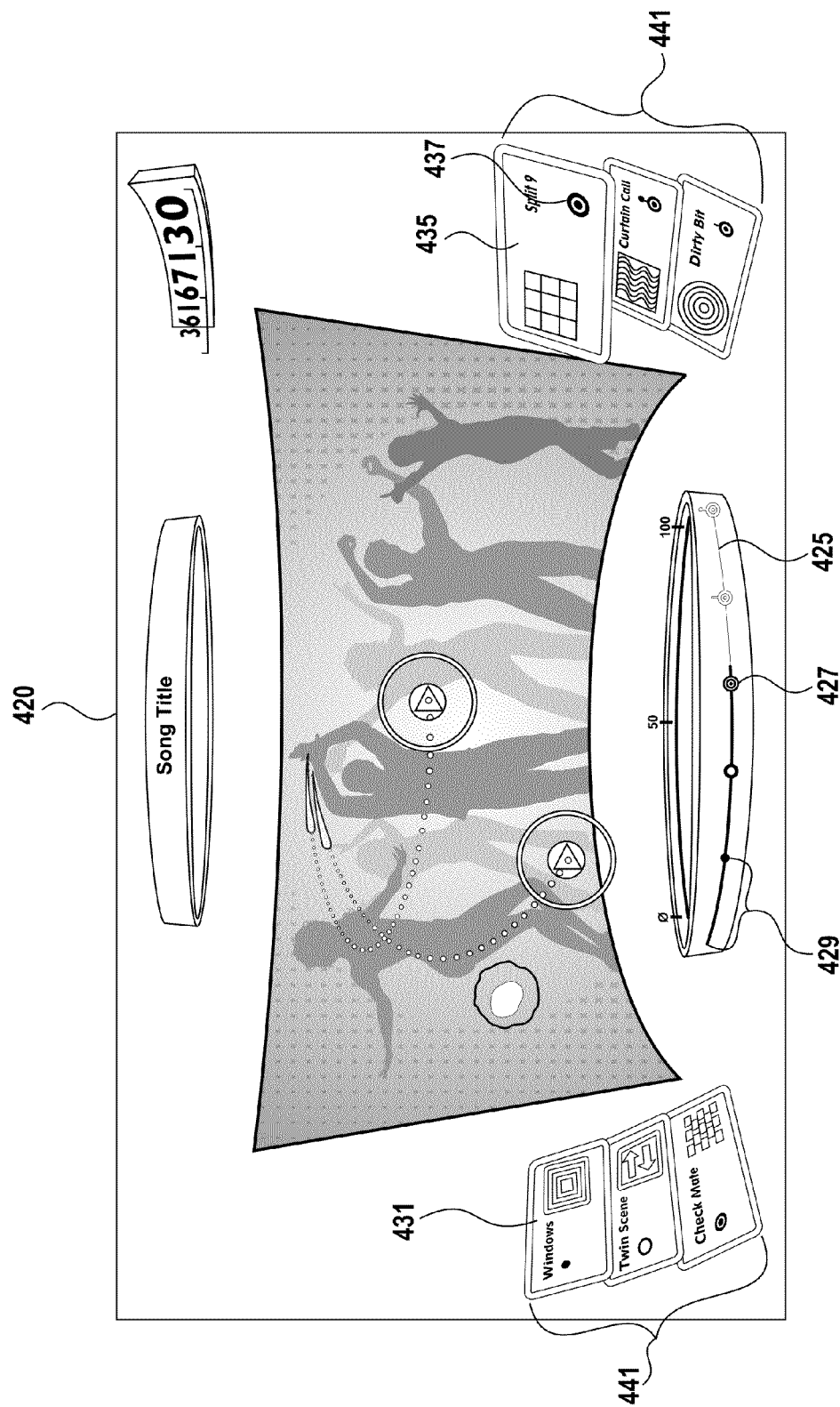
FIGS. 4A-4D are exemplary screenshots depicting progressive screen displays of an embodiment of a music video game.

The VFX system contains a variety of special effects (generally referred to as VFX) that work in conjunction with the music video. Referring to FIGS. 4A-4D, an embodiment of the VFX system is shown. FIG. 4A shows a screenshot of the graphical user interface during the main Music Gameplay. The Effects Gauge 425 represents the player's VFX level. By matching the correct beats (e.g., hitting the Sound Notes), the Effects Gauge will start to fill up. The Effects Gauge 425 contains several "bars" indicating the threshold level at which one or more VFX may be activated. For example, as shown FIG. 4A, when a bar 429 is filled, a special effect called "Windows" 431 can become available. Some VFX may require two or more bars to activate. For purposes of illustration, an icon 435 labeled "Split 9" may require three bars to activate. A symbol 437 can be placed within the icon 435 to indicate the level at which the Effects Gauge must be filled (e.g., the symbol 437 is represented by two concentric circles, which also appears at the third-bar level 427 on the Effects Gauge). The Effects Gauge fills up incrementally as the player hits the right Sound Notes and is depleted as a VFX is used. In some embodiments, there may be other ways to fill up the Effects Gauge, including reaching a certain score or obtaining a "powerup" that may be randomly generated during gameplay.

The player can activate the VFX by interacting with a VFX panel 441. According to an exemplary embodiment, a VFX panel 441 is made up of multiple VFX icons shown on the sides of the screen. Each VFX icon represents a special effect that the player can select to edit the music video. During normal Music gameplay, the VFX icons are visible in the background, but the player cannot directly interact with them. In other words, when the Orbs float over the VFX icons before the VFX panel is activated, no response results. To activate the VFX panel, the player can move one or more Orbs outside of the Gameplay Zone 420 to the left or right side of the screen. Once the VFX panel 441 is activated, one or more VFX icons can be chosen, depending on how much the Effects Gauge is filled up. As shown in FIG. 4A, an icon 435 with the effect called "Split 9" is highlighted and is projected toward the player. If the player is using a motion-sensing system, he can simply wave his/her arms up and down to highlight the VFX of his/her choosing and activate the VFX by sliding it toward the middle of the screen. In this embodiment, the Orbs disappear once they are moved outside of the Gameplay Zone. At this point, instead of controlling the Orbs, the player gains control over the VFX panel by highlighting the VFX he or she wishes to activate.

Alternatively, in another embodiment, the player retains control of the Orbs at all times. Like the previous embodiment, the player can activate the VFX panel by moving the Orbs outside of the Gameplay Zone. But instead of controlling the panel and highlighting the icons directly, the Player can continue to move the Orbs and select a VFX by touching an Orb to the VFX icon. In one embodiment, the VFX icon will only be selected after the Orb is held on top of the icon for a designated period of time (e.g., 1 or 2 seconds), so that the player can change his/her mind and move the Orb away in time to cancel the VFX selection. Another way to activate the VFX panel is to use a voice technology system such as the one enabled by the KINECT® system. This way, the player can simply issue a voice command to open up the VFX panel. If the player is using some type of analog controller or keyboard, then he or she may be able to activate the panel by pressing a button or key.

In some embodiments, the VFX panel does not need to be activated before the selection of the VFX, so the player can float the Orb over a VFX icon at any time to select it. Similarly, the player can also select a VFX directly by issuing a voice command or pressing a button or key. In some embodiments incorporating a head-tracking function (described in more detail below), the VFX panels may not initially appear in the Gameplay Zone. However, as the player looks to the right or left side, the view will slightly pan to that side, and the player can subsequently see and access the VFX icons.

In another embodiment (not shown), several VFX Indicators are represented as circular segments, positioned on or adjacent to a VFX icon to provide a visual representation of whether that particular VFX can be activated given the current level of the Effects Gauge. For example, three VFX icons (top, middle, bottom) may be located on a screen, each with a VFX indicator. As the player fills up one bar on the Effects Gauge, that bar corresponds to a segment on the VFX Indicator. The top Indicator only requires one segment and shows that the corresponding VFX is ready to be activated, while the middle Indicator requires two segments and the bottom Indicator requires three segments to activate their respective VFX. At this point, the player can choose to activate the top VFX, or wait to fill up the Effects Gauge to access the middle or the bottom VFX.

Figure 4B:
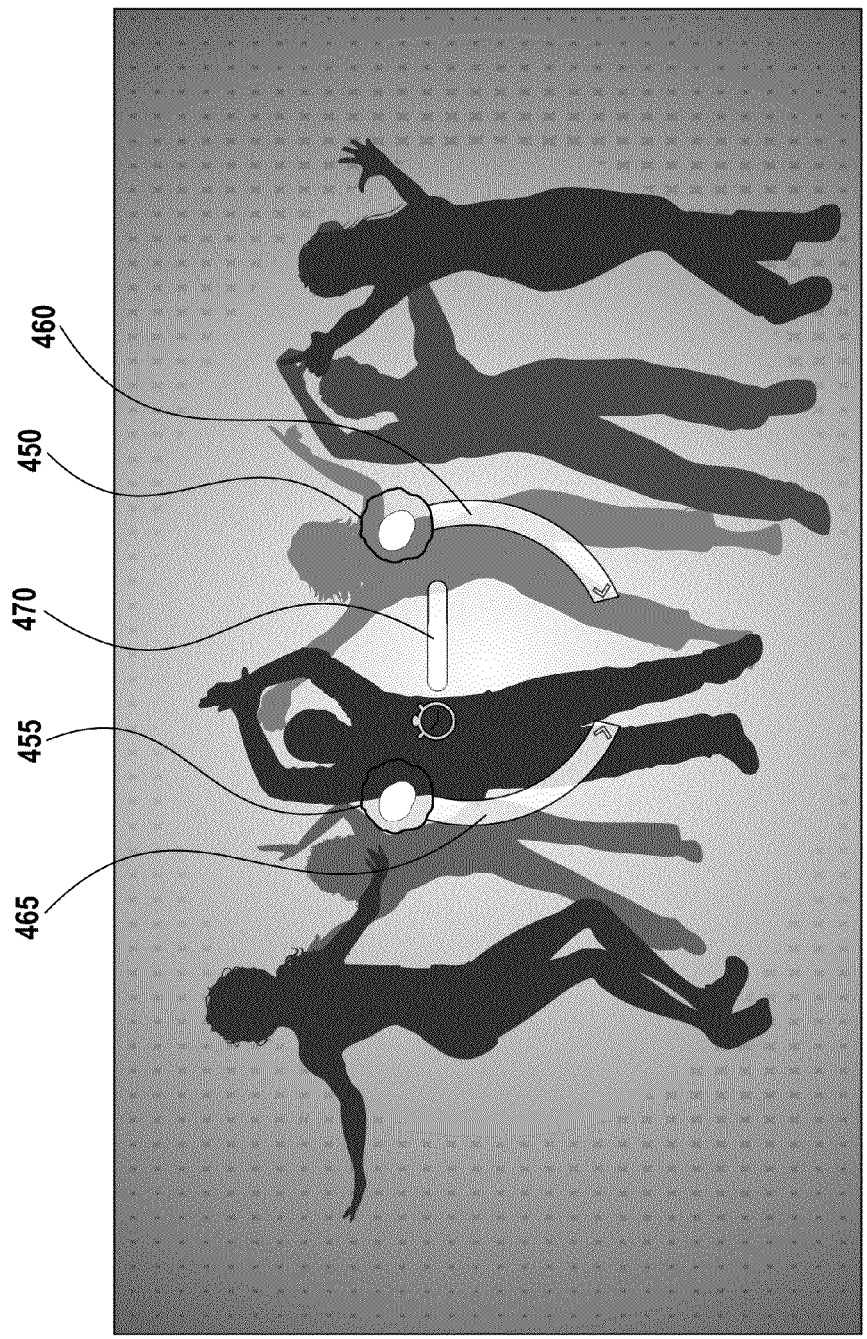
Figure 4C:
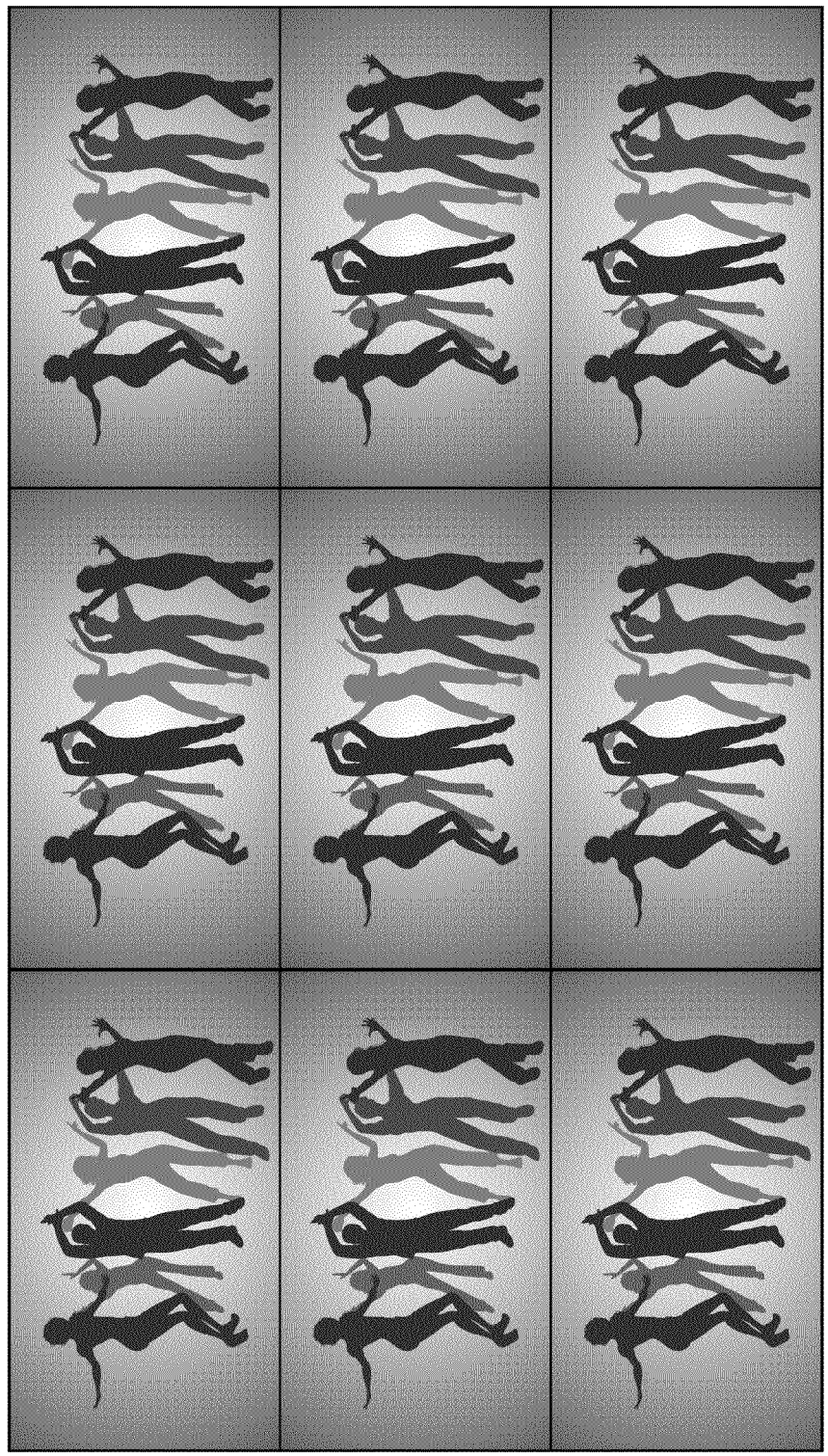
Figure 4D:
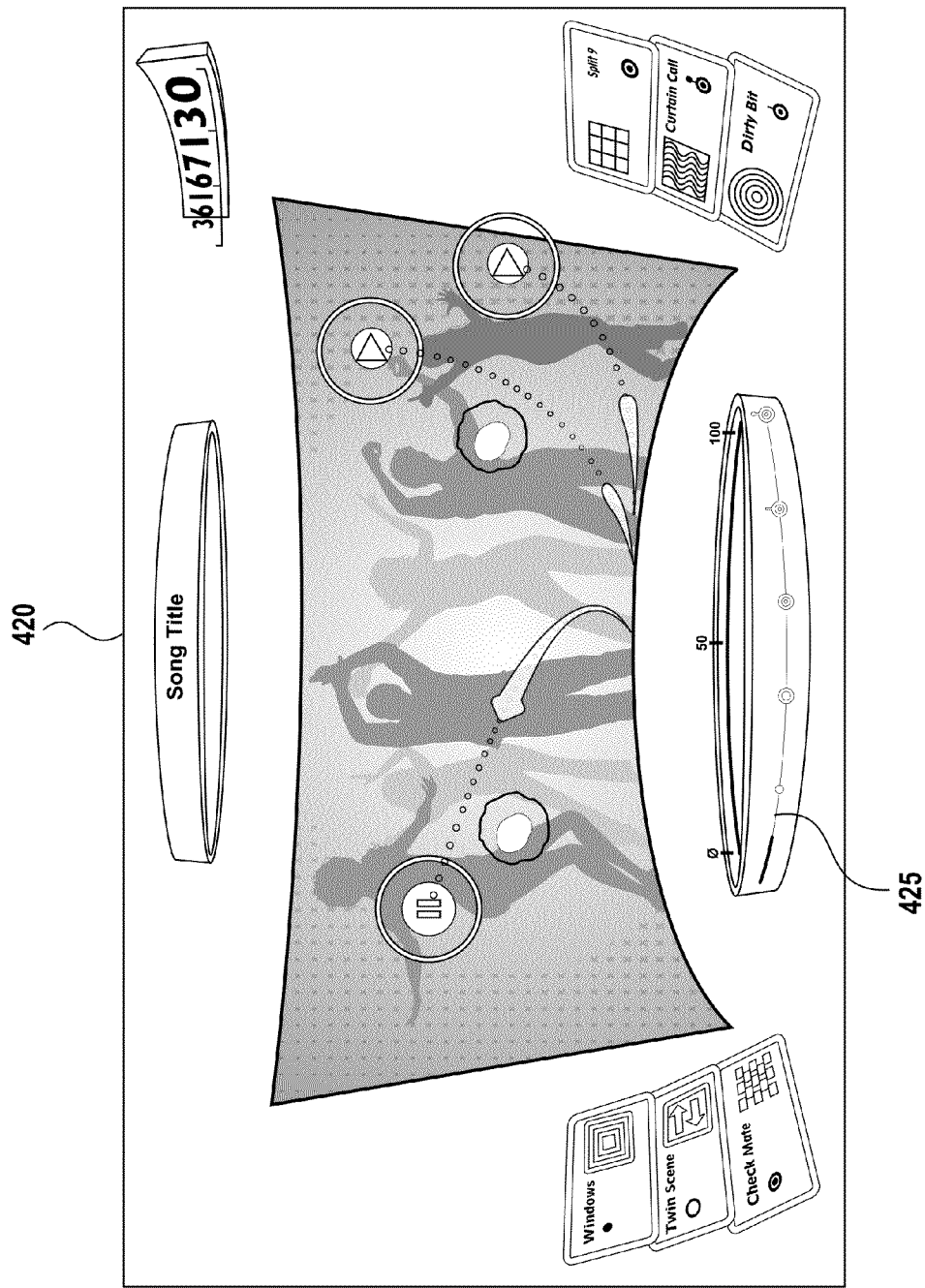

When the player activates VFX, gameplay transitions into a Music Video VFX gameplay which comprises one or more "mini-games." In a preferred embodiment, as shown in FIG. 4B, the main Music gameplay zooms into the music video, which fills up the entire screen. A simulated graphics "explosion" can accompany the zooming to indicate the transition to the Music Video VFX gameplay. In this mode, one or more Guide Notes 460, 465 appear on the screen with a timer 470. The player is directed to move the Orbs 450, 455 in the direction as shown by the Guide Notes before the timer expires. If the Guide Note(s) are performed successfully, then the music video will be edited with the selected VFX. The player will then be able to watch the edited video for a few seconds (the length of which can be adjusted), as shown in FIG. 4C. After the time expires, the screen zooms out and the music video screen returns to the background and gameplay resumes, as shown in FIG. 4D.

While the player is playing the game, the music video is recorded and stored in a memory of the gaming console. The music video can be customized in accordance to how the player plays the game and activates the VFX options. In an exemplary embodiment, the VFX option changes the video, but the main Music gameplay does not affect it. In another embodiment, both the main Music gameplay and the Music Video VFX gameplay can affect and alter the video. At the end of the game, players can view the videos that they've created, as well as having the ability to save them and share them. According to another aspect, the sensor system includes a camera that can record the player during gameplay, and the player will be able to see a recording of himself/ herself after the game ends.

Figure 5A:
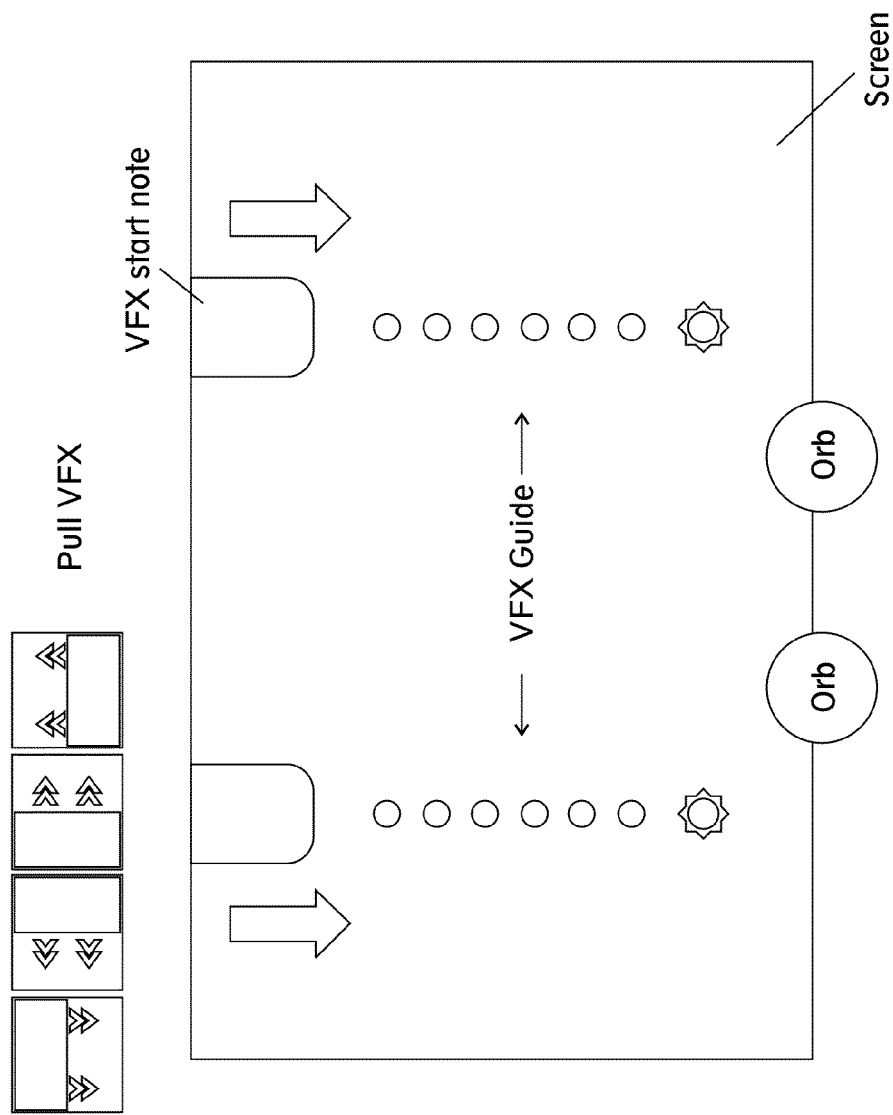
FIGS. 5A-5Y are diagrammatic representations of exemplary VFX options and associated Guide Notes used in some embodiments of a music video game.

Illustrations of numerous possible VFX options and associated Guide Notes are shown in FIGS. 5A-5Y. It should be noted that a VFX need not correspond to any particular type of Guide Note or player movement and that the illustrations provided are merely examples. In some embodiments, the Guide Notes may be performed by moving one or more Orbs in a certain direction or pattern. This is preferably done with a motion-sensing system that tracks the player's movements and translates them into Orb movements. Alternatively, other means to move the Orbs, such as controllers, can be used as well. In other embodiments, the performance of Guide Notes may not involve Orbs at all, and may be accomplished by voice commands or by particular body movements tracked by the motion-sensing system.

Pull VFX: Referring to FIG. 5A, the player is able to choose which side or corner the music video appears from. Depending on the direction chosen, the player raises both arms and swings them in such direction. For example, if the player has chosen the "Pull Down Effect," then he or she will have to raise both arms and pull down (or swing the arms down) to activate the effect. The music video will then appear to slide down from the top.

Figure 5B:
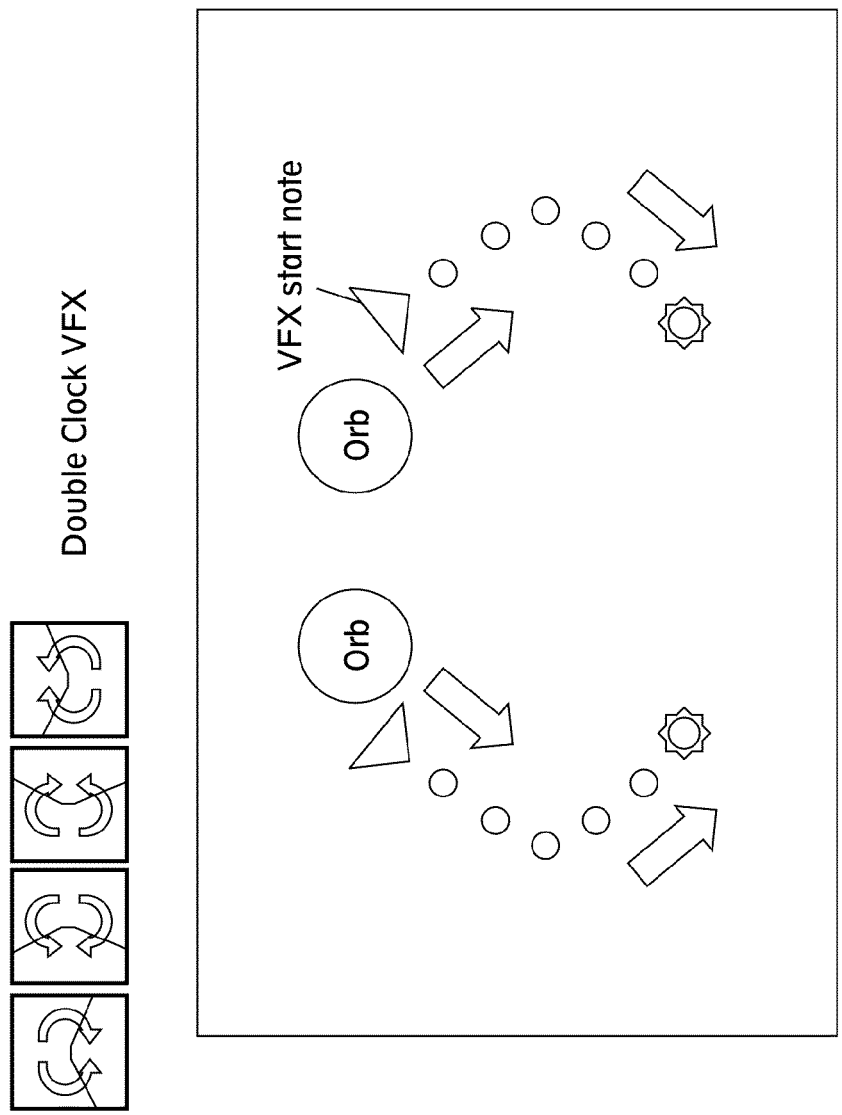

Double Clock VFX: Referring to FIG. 5B, the music video opens in a circular motion upon activation of this effect. The player will be able to choose which direction it spins. Depending on the direction of the effect chosen, the player can take both hands and make a circular motion toward the chosen direction.

Figure 5C:
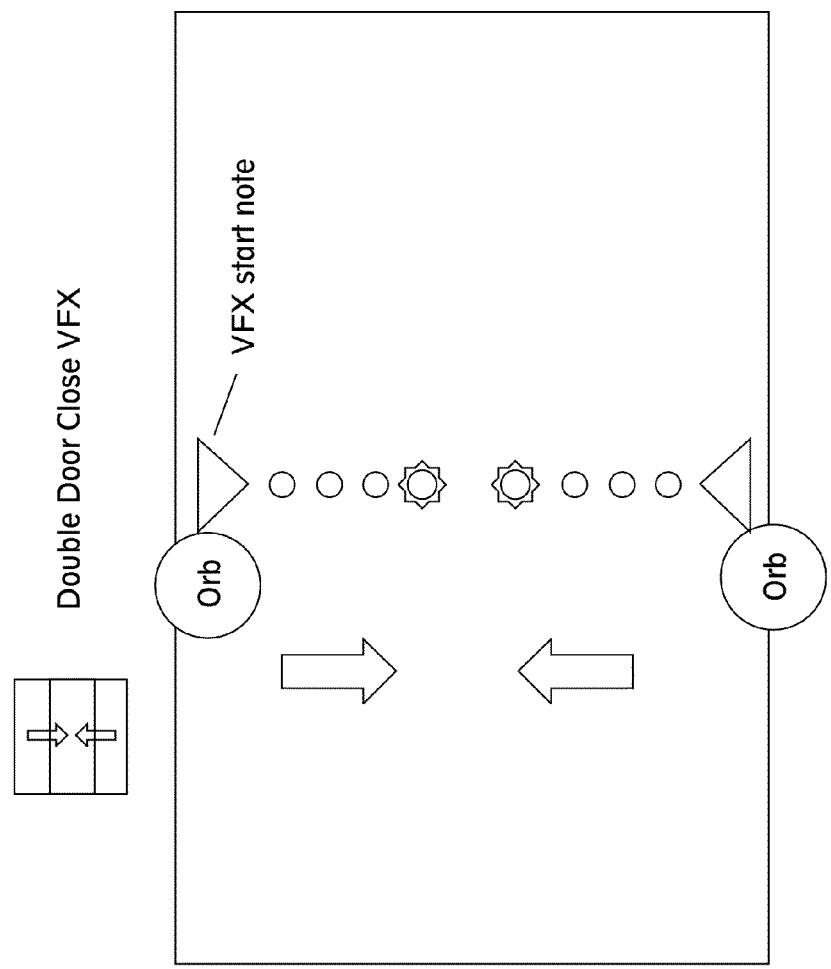

Double Door Close VFX: Referring to FIG. 5C, the music video is split vertically and appears from the left and right of the screen, meeting at the center. To activate this, the player has his/her arms apart horizontally and brings them together in a closing motion. A variation of this is splitting the music video horizontally and having the two images appear from the top and bottom of the screen, meeting at the center. To activate this, the player has his/her arms apart vertically and brings them together in a closing motion.

Figure 5D:
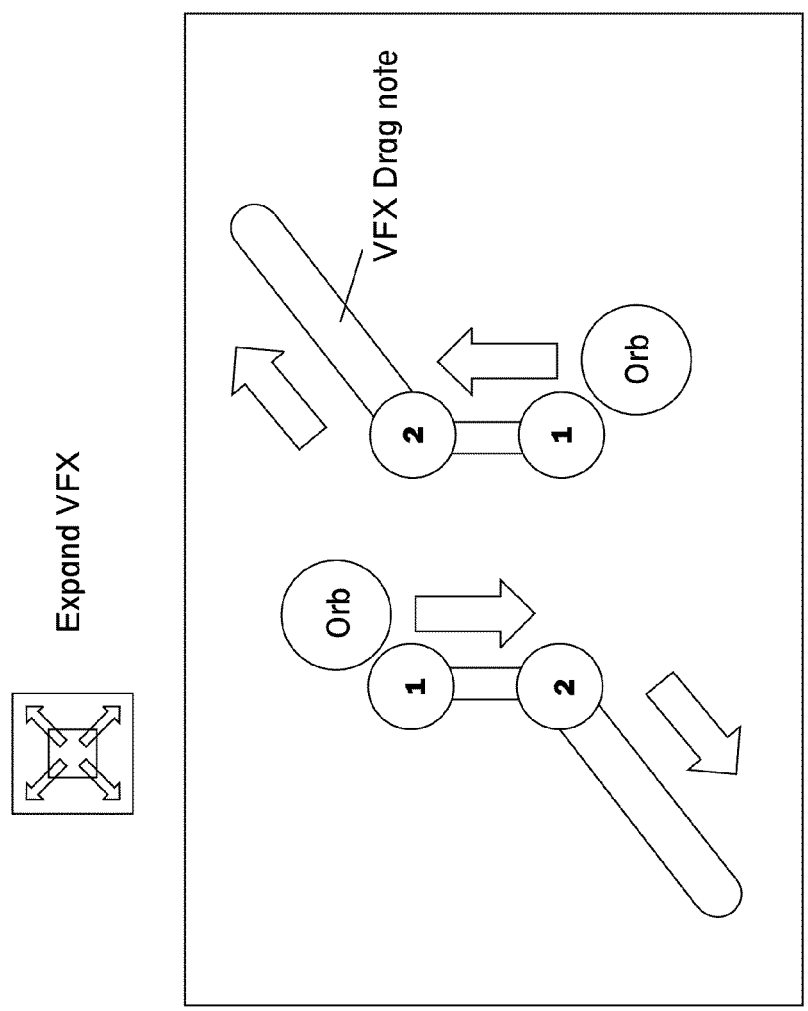

Expand VFX: Referring to FIG. 5D, the music video expands from the middle of the screen to full screen. The player has his/her arms straight out. For the first step, one arm goes up slightly while the other goes down slightly. For the second step, the player spreads his/her hands apart diagonally to initiate the effect.

Figure 5E:
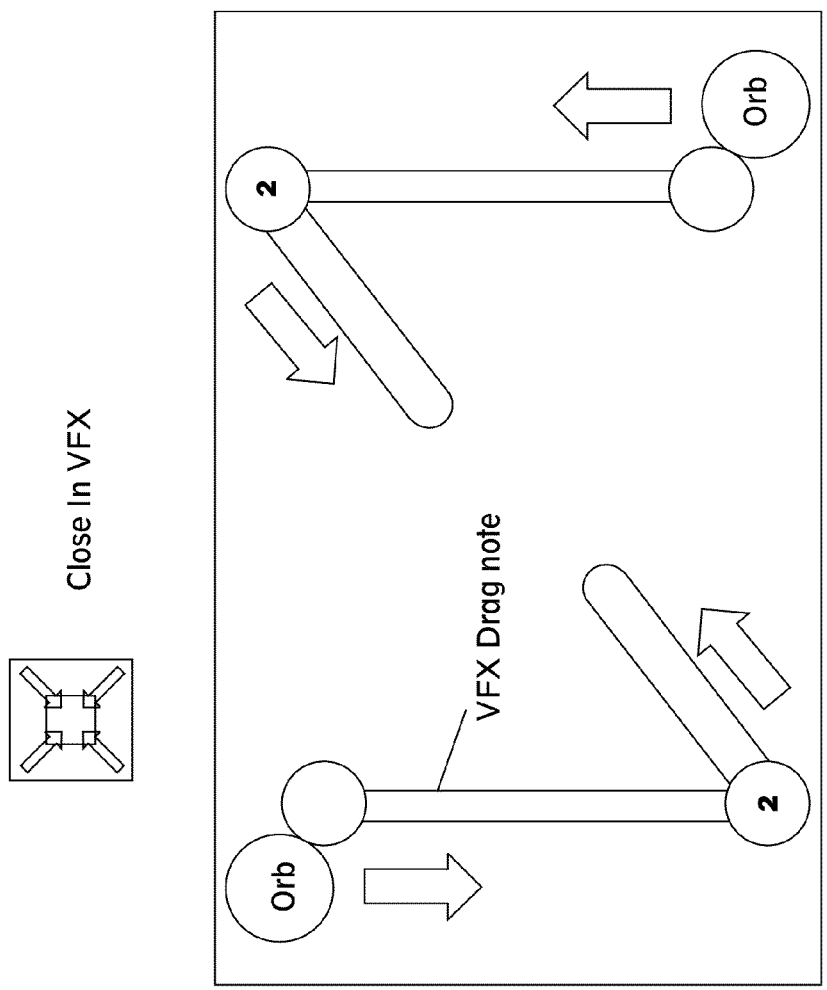

Close In VFX: Referring to FIG. 5E, the music video shrinks to the middle of the screen. To activate, the player has his/her hands spread apart with each hand in an opposite corner from the other. The player brings one of the hands down while the other goes up. Then the player brings both hands to the middle diagonally.

Figure 5F:
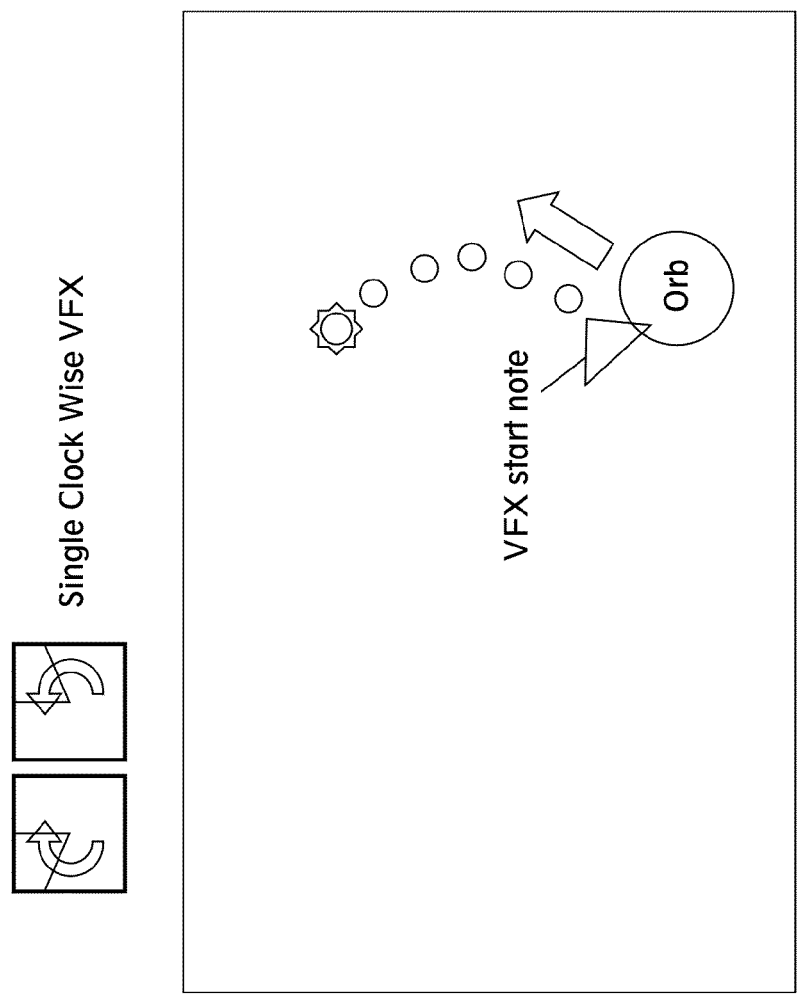

Single/Multi Closewise/Counter Clockwise VFX: Referring to FIG. 5F, the music video opens in a clockwise or counter-clockwise motion. The player makes a clockwise/ counter-clockwise motion depending on direction he has chosen. A variation of this is implementing a double clockwise or counter-clockwise effect, as shown in FIG. 5G, by splitting the images and opening up the portions of the image simultaneously. To initiate this effect, the player raises one hand and keeps it there for the hold note while the other hand creates a clockwise or counter-clockwise circular motion depending on the direction he has chosen. To achieve a quad split, as shown in FIG. 5H, the player can raise his/her hands and bring it down in a clockwise or counter-clockwise motion depending on the chosen direction. To split the images even more, the player can move both hands in a clockwise or counter-clockwise circular motion depending on the chosen direction. This is shown in FIG. 5I. In some embodiments, this special effect can be accompanied by a change in the underlying graphics as well. For example, as the video opens in a clockwise or counter-clockwise motion, the original video can be in color while the portion that is being opened can be in black-and-white. When the circular motion completes, then the video can be entirely in black-and-white for a few seconds, and then revert back to color again. Similarly, the video can start with a normal image, but transform into a cartoon version as the image rotates, then revert back to the normal image after a certain time.

Figure 5J:
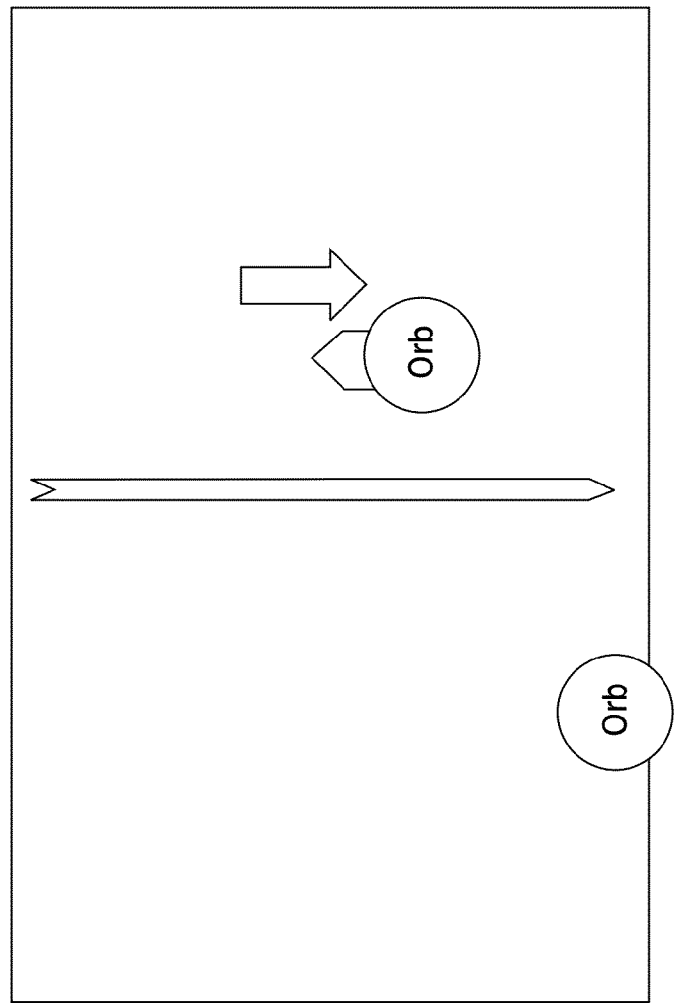

Split VFX: Referring to FIG. 5J, this effect splits and duplicates the music video. To initiate this, the player can raise one hand and bring it down vertically.

Split inverse VFX: Referring to FIG. 5K, this effect splits, duplicates the music video, and inverts one of the images. To initiate this, the player raises one hand and keeps it there for the hold note while the other hand is raised and then brought down vertically.

Figure 5L:
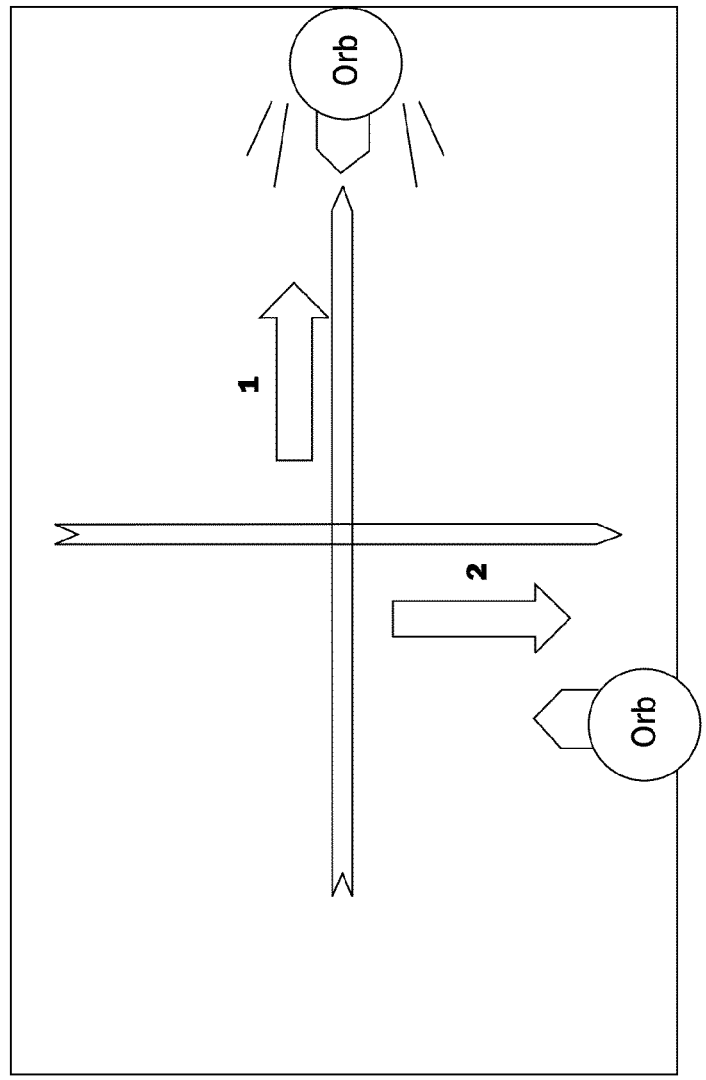
Figure 5M:
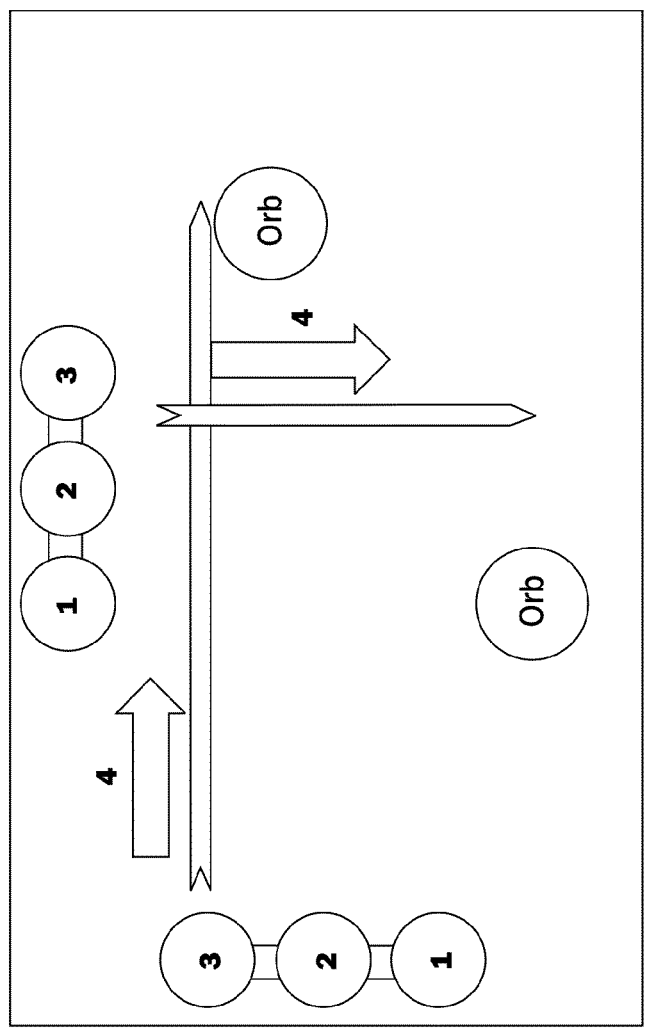

Window effect/Super Window VFX: Referring to FIG. 5L, this effect creates multiple duplicates of the music video that fill the screen. For example, to create four windows, the player raises one hand and brings it down vertically, followed by a horizontal "slash." To create a "super window" consisting of 16 duplicate images of the music video in a matrix, as shown in FIG. 5M, the player raises one hand and hits 3 music notes horizontally before bringing the hand down. The player then repeats with the other hand but this time hitting notes vertically and then making a "slash" horizontally.

Figure 5N:
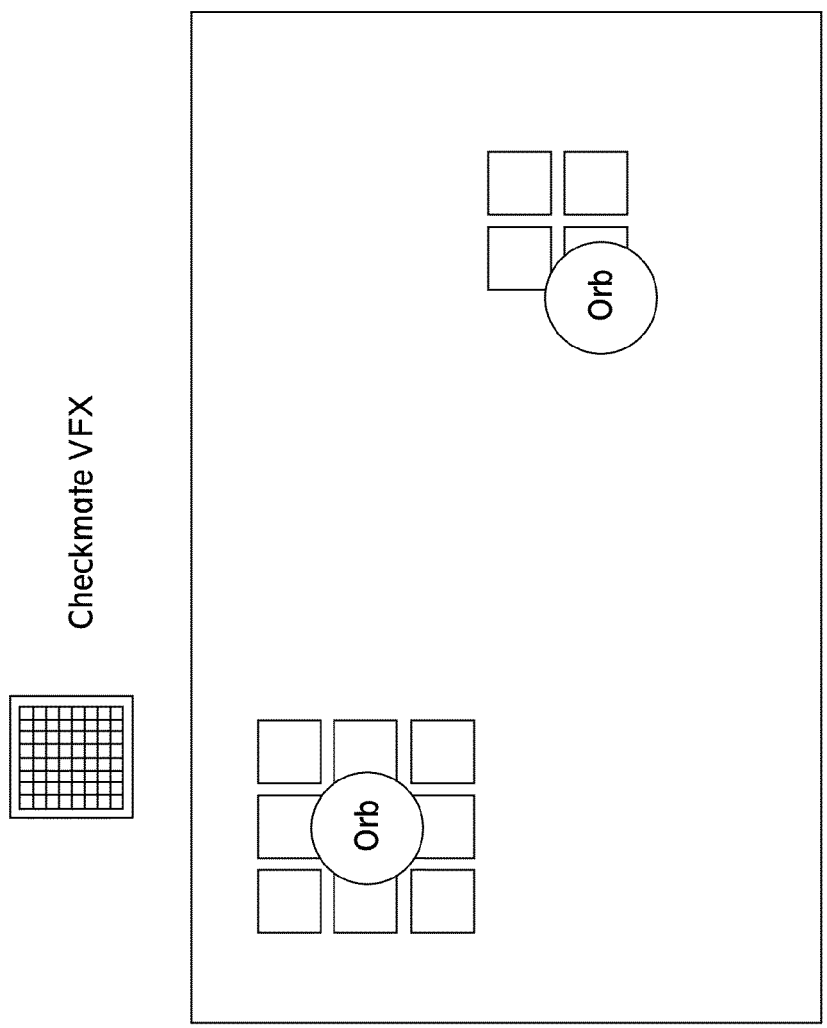
Figure 50:
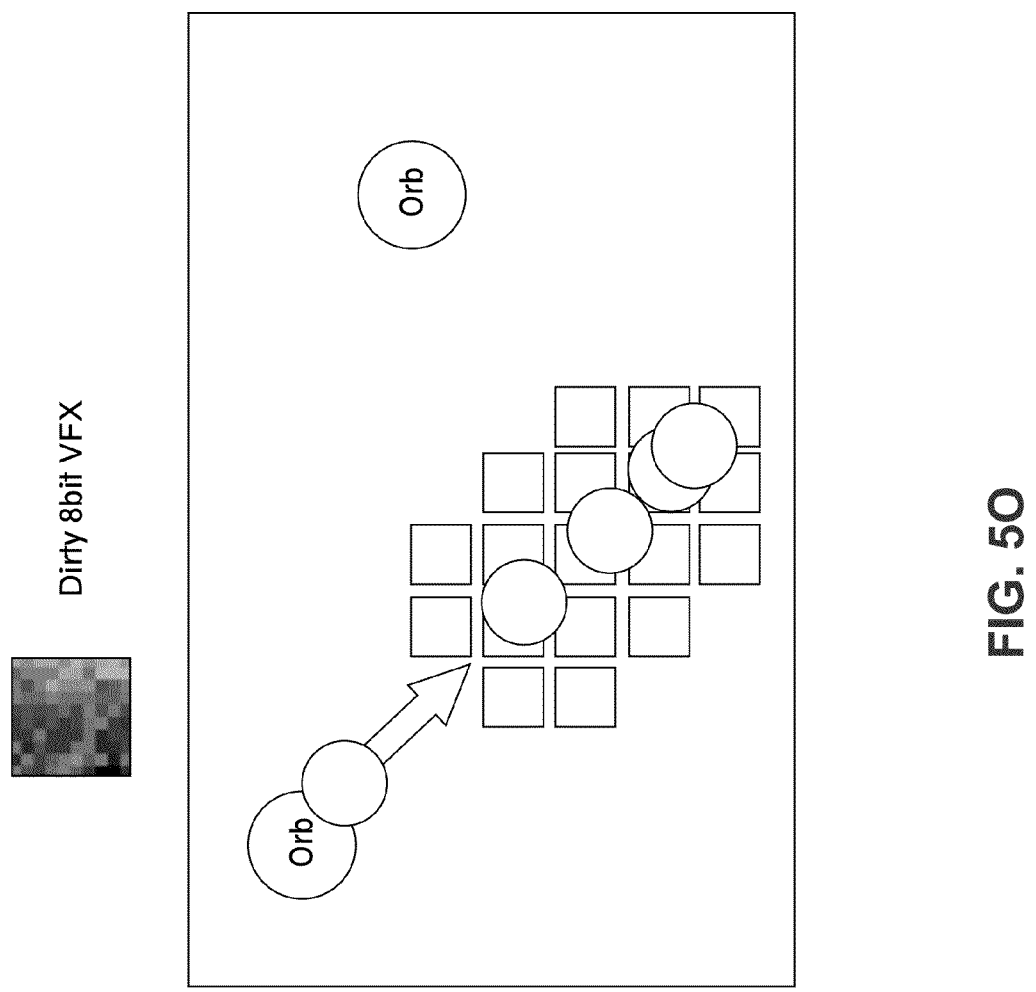

Checkmate VFX: Referring to FIG. 5N, this effect creates a checkered effect like a chess/checker board for the music video. To activate this effect, the player will be prompted to hit music notes on the screen. When the notes are hit, the section that was hit will turn into a checkered pattern.

8-Bit VFX: Referring to FIG. 5O, This effect pixelates the music video for an 8-bit look. When prompted, moving the orb will leave a "trail" of an 8-bit effect.

Hypnotize VFX: Referring to FIG. 5P, this effect creates a circulate pattern that appears in a rotating motion. To activate this, the player can use one hand to create a circular motion and then use the other to move in a diagonal direction.

Curtain call VFX: Referring FIG. 5Q, the music video splits away from the middle. To activate, the player start with his/her hands together and moves them apart in a half circle motion.

Jenga VFX: Referring to FIG. 5R, the music video splits into an even number of equal parts, with half of the parts moving upward and half moving downward. To activate, the player first has his/her hands apart with each hand in an opposite corner. The player then brings his/her hands together diagonally with the hands meeting in the middle and then raise one hand while the other is lowered.

Figure 5S:
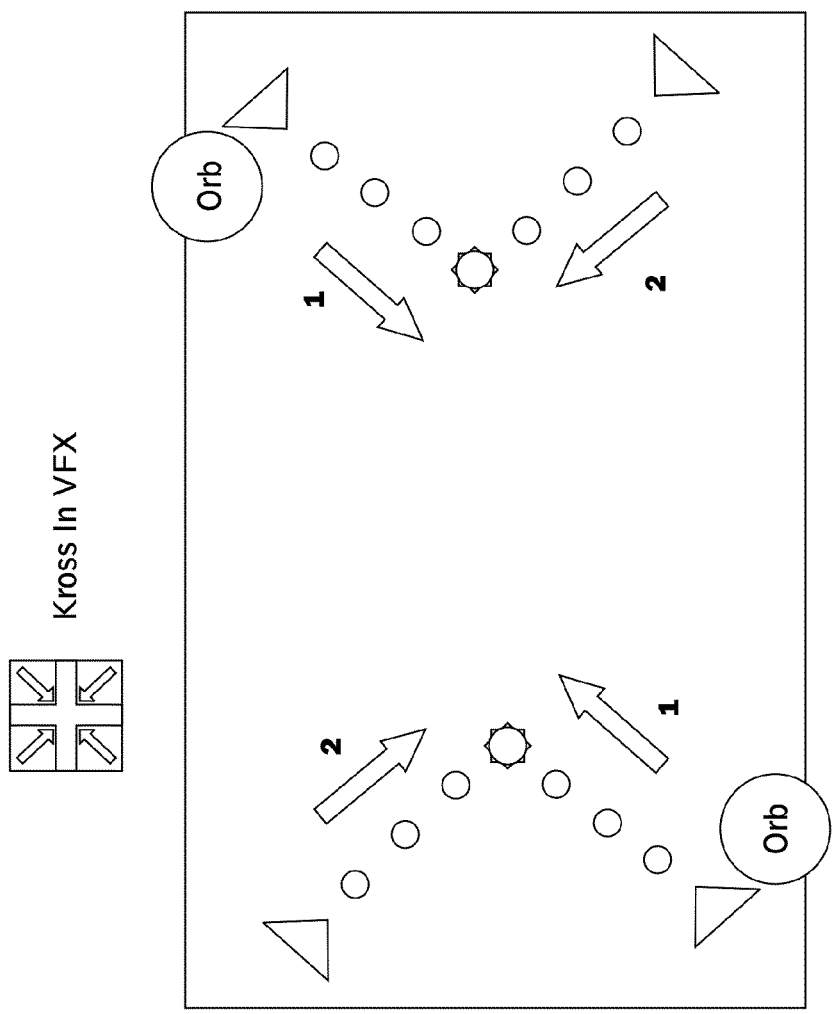

Kross In VFX: Referring to FIG. 5S, the music video is split in four equal sections and appears from the four corners of the screen, meeting in the middle. To activate this, the player has his/her hands spread apart with each hand in opposite corners. The player then brings his/her hands together diagonally with the hands meeting in the middle. The player then repeats this motion by spreading his/her hands out again but this time in the other two corners and brings his/her hands in together diagonally.

Figure 5T:
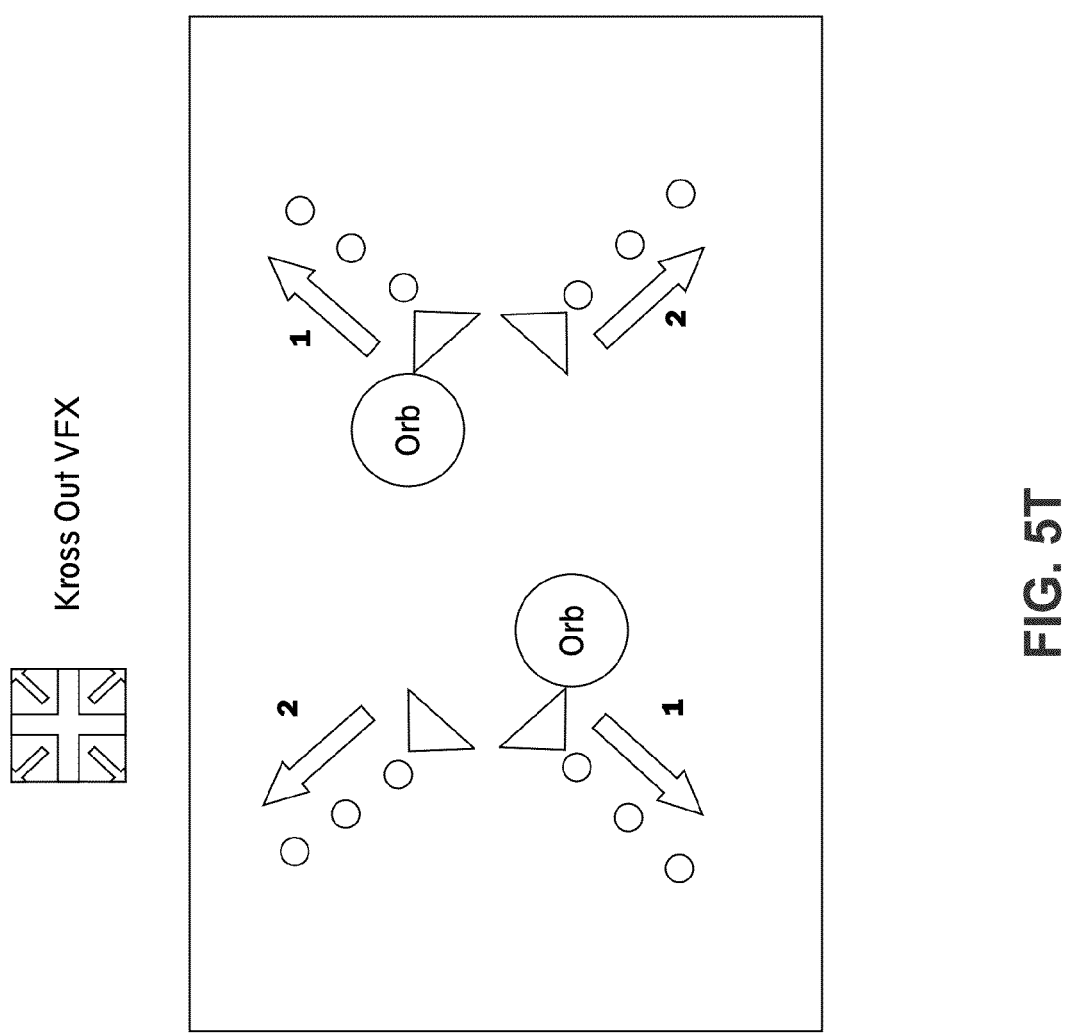

Kross Out VFX: Referring to FIG. 5T, the music video is divided in four equal sections. The four sections split apart and move toward the four corners of the screen. To activate, the player has his/her hands straight out. One hand moves down to a diagonal corner while the other goes up to the opposite diagonal corner. Then the player brings the hands back and repeats this motion for the other opposite corners.

"007" VFX: Referring to FIG. 5U, this effect shows a visual effect inspired by the James Bond movies where the music video is shown through the barrel of a gun. To activate, the player can make a "James Bond" pose by bringing both hands together and raising them up as if holding a gun.

Figure 5V:
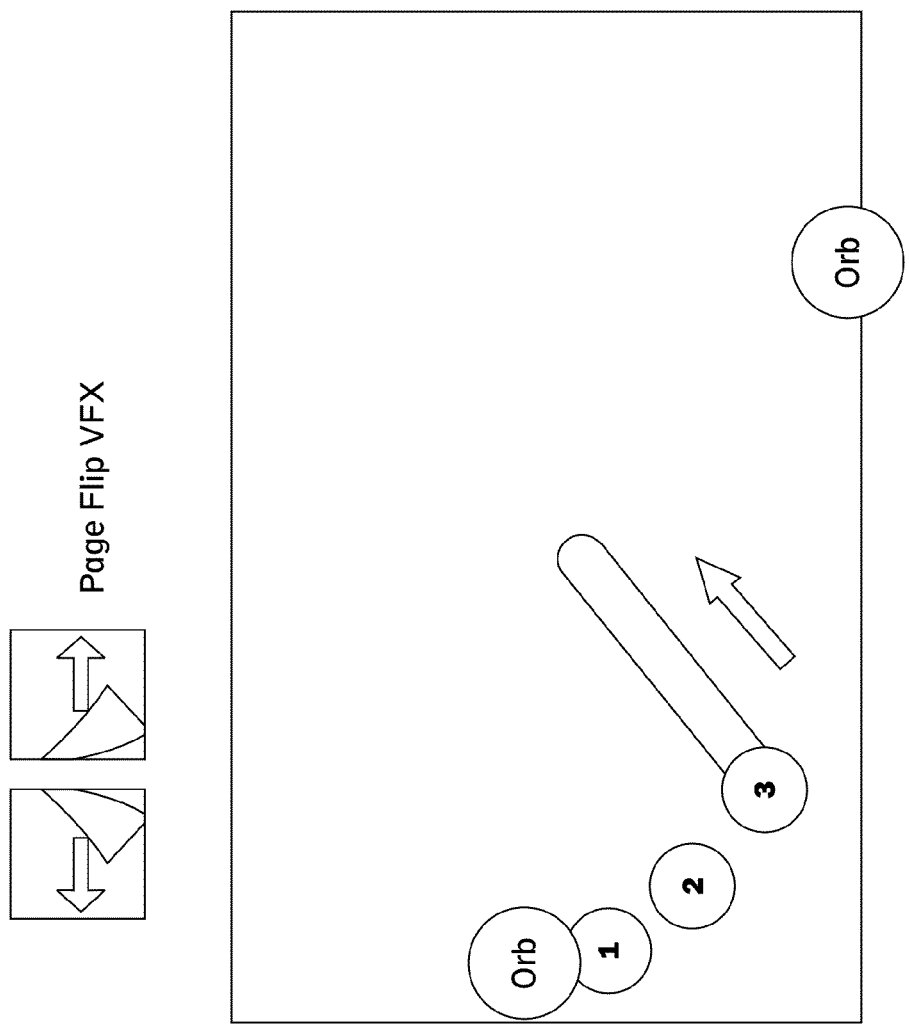

Page Flip VFX: Referring to FIG. 5V, the music video appears as if it is a page that can be flipped manually. The player can control the direction of the flip. To activate, the player has his/her hand out diagonally on his/her side and lightly swings it across to the opposite direction, as if turning a page.

Flip Cube VFX: Referring to FIG. 5W, the music video is shown on a surface of a 3D cube, which rotates horizontally. To activate, the player can raise one hand and bring it down vertically, followed by a horizontal "slash."

Figure 5X:
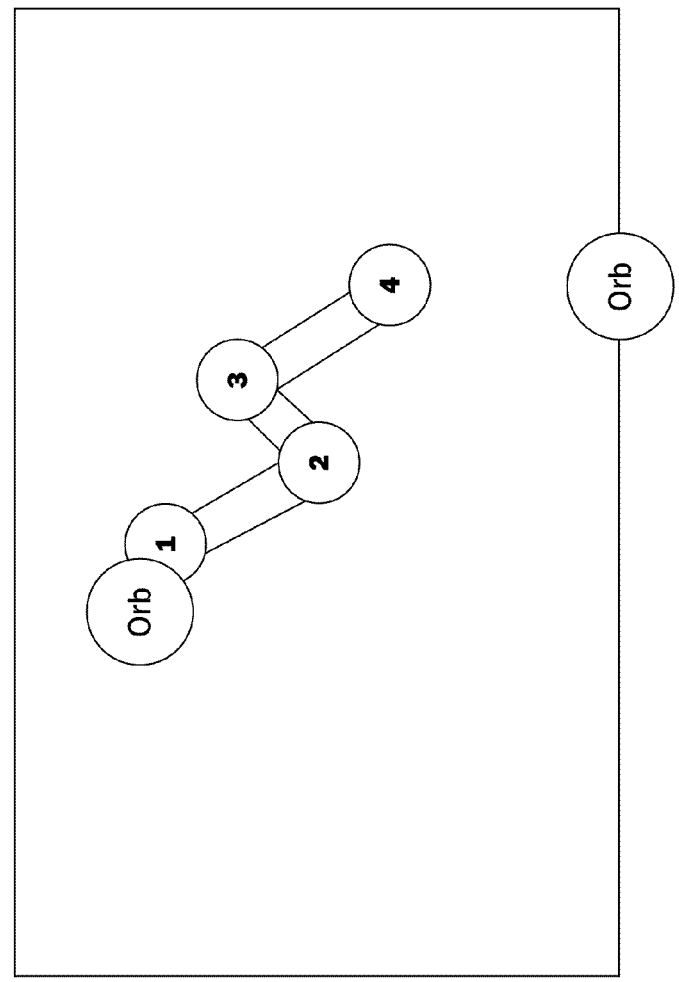

Ooze VFX: Referring to FIG. 5X, the music video "oozes" down from the top of the screen. To activate, the player uses one hand to create wave motions from one side to the other by creating a zig-zag motion with his/her hand.

Vertical/Horizontal Expand VFX: Referring to FIG. 5Y, the music video splits from the middle of the screen, and moves apart vertically or horizontally. The player can control the direction. To activate, the player spreads his/her hands horizontally and brings them together in the middle while hitting the guide notes. After the hands meet in the middle, one hand is brought down, while the other is raised up.

Head-Tracking

Figure 6:
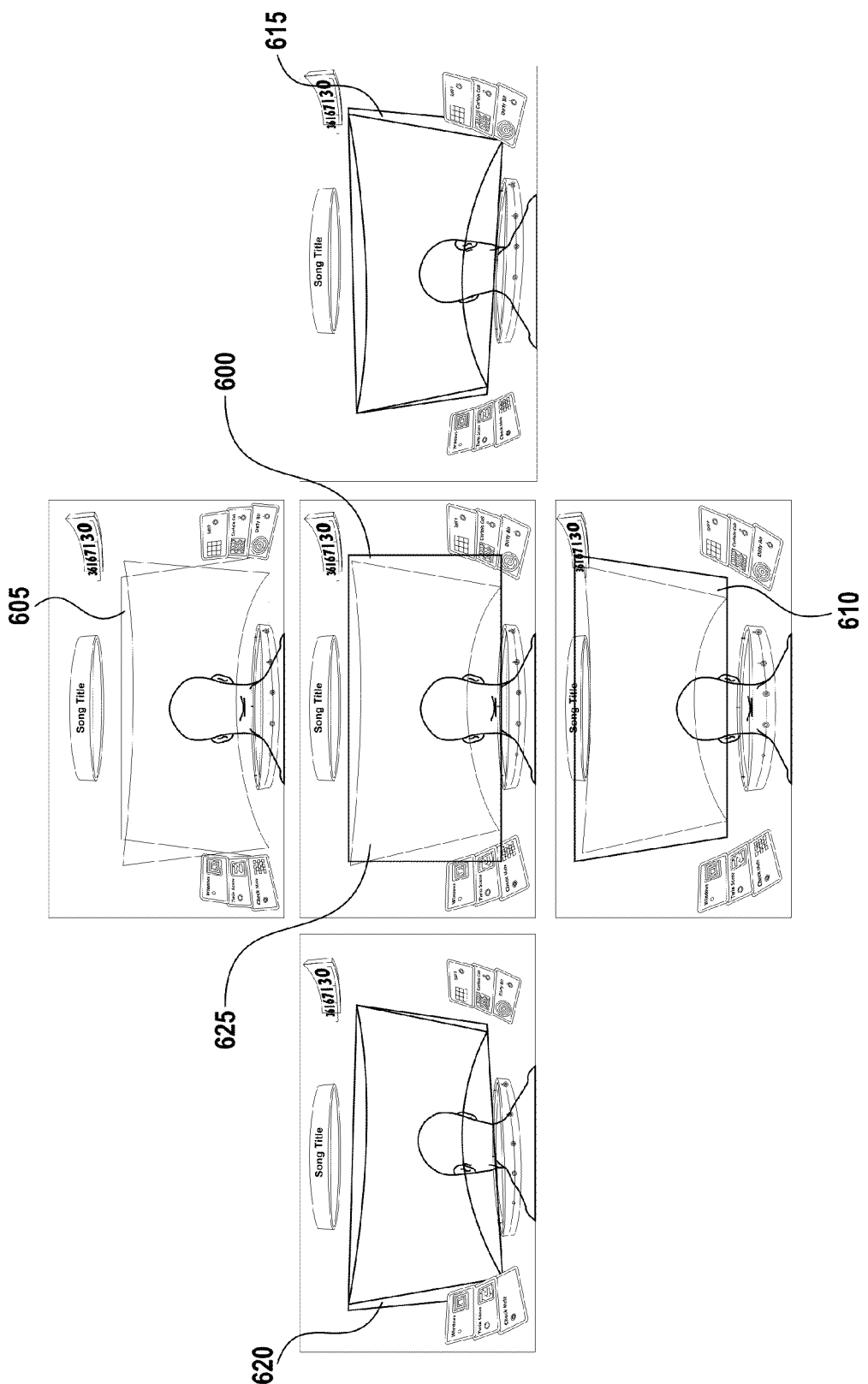
FIG. 6 illustrates a series of exemplary screenshots depicting the head-tracking function in an embodiment of a music video game.

In an exemplary embodiment, the devices, systems, and methods described herein use a head-tracking feature to simulate a 3D or depth-perception effect. FIG. 6 depicts an example of how this feature would work. When the player swivels his/her head, the screen changes accordingly to give an impression of a depth perception. For instance, the display screen can be conceptualized as a view of a window into a more expansive universe. When the player looks forward, the window displays the forward-looking view 600. When the player turns his/her head to the left, the window 620 will move and display an image as if he/she is looking in a leftward direction in a 3-dimensional virtual space. Similarly, when the player turns his/her head in another direction 605, 610, 615, the view of the window will change in accordance to his/her head position. The image of the music video 625 can also shift relative to the view of the window to accommodate the illusion that the player is looking at a 3-dimensional space. For example, by moving his/her head, the player may change the perspective of the music video such that the image on one side appears larger than the other side to provide the visual impression that the larger side is closer to the player.

In some embodiments, a swivel of the head will enable the player to see more information that may otherwise be unavailable in a forward-looking view. For example, the VFX icons may be hidden to the sides when the player looks in a forward direction. As the player turns his/her head to the left or right, the screen will pan slightly in the same direction, giving the player a broader view in that direction and revealing the VFX icons. This capability gives the player the option to access and interact with the VFX panel simply by moving his/her head.

Gameplay Flowchart

Figure 7:
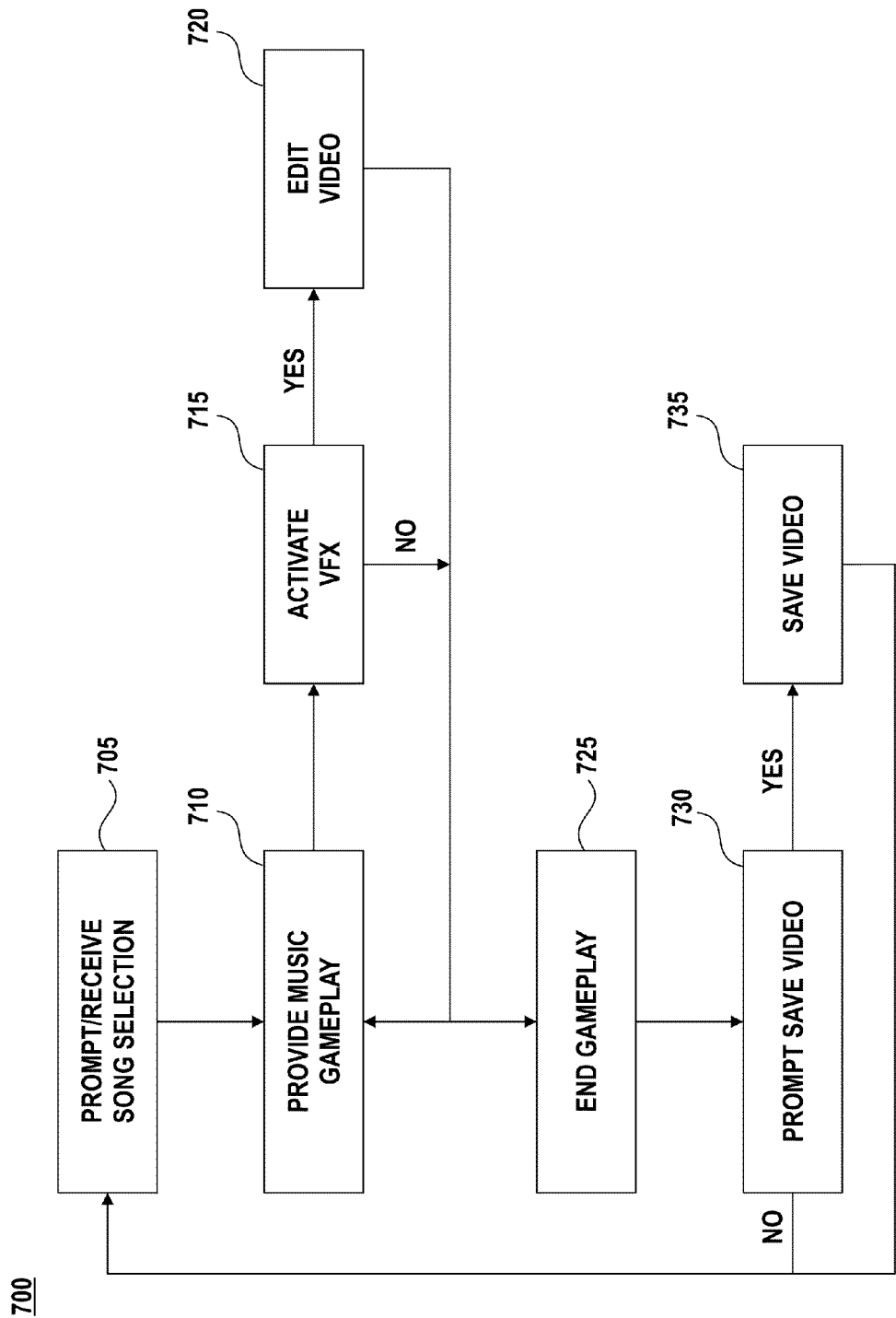
FIG. 7 shows a flowchart outlining some procedures that are executed on the gaming platform to implement an embodiment.

The techniques described herein can be implemented in digital electronic circuitry, or in computer hardware, firmware, software, or in combination thereof. The implementation can be as a computer program product for execution by, or to control the operation of data processing apparatus, e.g., a programmable processor, one or more computers, or one or more gaming consoles. FIG. 7 shows a flowchart 700 of steps to implement an embodiment. Flowchart 700 is a series of steps that may be executed by a gaming platform or a computer processor, or otherwise executed to perform the identified functions. It may also be stored as program code on an electronic memory medium.

In step 705, the player is prompted to select a song or music video. Once the selection is received, the Music Gameplay mode is initiated in step 710, and the music video starts playing. Sound Notes are generated and begin to move toward the player in a three-dimensional space. Various Sound Notes carry different instructions, or "objectives," for certain movements to be performed, and engage the player as he or she attempts to interact and complete the objectives instructed by each Note. Completing objectives by the player results in smooth seamless music and continuous gameplay, whereas failure to do so depletes the health gauge and terminates gameplay in step 725.

During the Music Gameplay mode, successful completion of the objectives of the Sound Notes enables the player to engage the VFX system and to select one or more VFX to enhance the music video. Once the player has chosen a VFX, Guide Notes will appear, giving the player new objectives depending on the VFX he or she has selected. This leads to steps 715 and 720, which occur in the Music Video VFX Gameplay mode. In step 715, activation of the VFX is evaluated to determine whether the player has successfully completed the objectives as issued by the Guide Notes. If so, then the music video is edited with the effects chosen by the player in step 720. If the objective has not been completed within the set time limit, then the Music Gameplay mode resumes. The player can alternate between the Music Gameplay mode and Music Video VFX Gameplay mode until gameplay ends. The gameplay ends in step 725 when the music video finishes or when the player's health gauge is completely depleted. The player is then prompted to save the customized music video that he or she has created in step 730. Receiving an affirmative instruction from the player will save the video in step 735, which can then be stored and shared with others. Depending on how the player has performed during the sections and which VFX he or she has used, the resulting customized music video can differ dramatically from the original music video. Each customized music video may also be unique due to the various combinations of the effects and the timing of those effects.

Customization

In some versions of the above methods, systems, computer program products, and apparatuses for providing an interactive music game, various game mechanics, elements, and control constructs can be customized. For example, the music Orb, used by the player to hit the incoming Sound Notes, can be of different colors, appearances, shapes and sizes. Each Orb may also be customized to enhance its performance and to enable additional functionalities.

In an exemplary embodiment, the Orb may contain one or more "sockets" in which "gems" can be placed. The number of available sockets represents the capacity of an Orb for customization and can also determine the extent to which the Orb can be customized. The sockets can be allocated with "gems," which enable "power-ups," or effects that dramatically simplify or enhance gameplay. Different types of gems may grant various functionalities and boost the performance of the Orb. For example, some gems can be designated to add extra time in the VFX mode. Some can boost a player's score. Some can cause the light trail to deplete more slowly than normal for a limited amount of time. Some grant unlimited light trail/movement for a time. Some can cause incoming music notes to move more slowly by a certain rate to make it easier to hit. Some grant the player with a random power-up when activating a video effect, etc.

During the course of the game, the player can gain new Orbs with different characteristics that may help the player during gameplay. For example, some music Orbs can contain additional "sockets" for "gems" to be allocated, or possess aura bonuses (e.g., aura dissipates more slowly). Using VFX can grant "power-ups" as well. For example, if a player uses a certain VFX, his energy can be refilled as a result. As another example, using certain gems or VFX can enable the player to earn points at a faster rate. This socket system and the use of "power-ups" provide customization and play options for the player.

Another embodiment features a profile system where players can customize their avatars, VFX settings, view their play history and achievements, and organize their music video collection.

The Avatar can be thought of as an in-game representation of the player. In certain embodiments, the Avatar comprises one or more Orbs controlled by the player. By playing through the "Campaign Mode" (described further below) and achieving certain tasks (e.g., score a certain number of points or completing certain missions), the players will be able to collect gems and Orbs that will allow them to customize and upgrade their Orbs through the socket system. Each Orb has a unique graphical representation and its own set of functions and features. Once the player has unlocked an Orb, the player can customize it by adding gems into sockets. Each gem added may also add different colors and appearance to the Orb.

In certain embodiments, customization can be achieved through a monetary system, wherein scores are tracked in terms of money. Players may "earn money" in various ways, such as hitting consecutive Sound Notes and getting "perfect" or "good" ratings on each hit. As money is accumulated, the players will be able to purchase Orbs or VFX with different characteristics.

The player can also select and set their VFX by customizing which ones they want, how many they want displayed, and where to place them. An aspect of the devices, systems, and methods herein contemplates a collection mode, where the player can view music videos that are stored on the game disc or downloaded via DLC (Downloadable Content—digital media available for download on the Internet, used to refer to content created by video games that is released separately from the game). Players can view their play videos and share them with others via proprietary servers, Youtube, or Facebook. Players can also download other players' videos and watch them.

As for downloaded videos, a player can view other players' videos stored on private server and rate or recommend them. The player can select a song by viewing or downloading them via one or more of the following options: (1) Friends list; (2) Highest rated; (3) Recommended; (4) Voted by other players; (5) Alphabetical; (6) Song genre. The player can also rate each video downloaded/viewed based on a multi-star system. The player can share/like (e.g., via Facebook) a video he has downloaded and viewed.

The player can also view his or her play history and statistics: e.g., favorite songs, most played songs, highest rated songs, favorite music genre, hours played, songs played. In addition to such statistics, the player can view what achievements he/she has acquired so far and the progress for unattained ones.

Game Modes

In some implementations, additional game modes can be made available to the player. For example, the "Campaign Mode" is a mission-based mode where the player must complete certain conditions and challenges to win bonus items for profile customization. Some challenges or missions can include hitting certain Sound Notes or using certain types of VFX to edit a music video. Other examples include: scoring over a certain number of points, hitting a certain number of Sound Notes in a row, completing a song without VFX, and getting a certain number of "perfect" ratings.

Another game mode is the "Freeplay Mode," which allows players to select and play any available song (including hidden songs that have been unlocked through gameplay). In such a mode, the player can try to "beat" the song by surviving until the end (by keeping up the health gauge) or playing the game creatively by using the VFX system to create a custom music video. In some embodiments, the player has the option to access any VFX and apply such VFX liberally without limits. The player can also set the game difficulty (e.g., easy, normal, or hard). The difficulty setting changes the number of Notes that appear on the screen and the level design is more advanced. For example, the easy level of a song might feature a section that has 2 Basic Notes while the hard level of the same song and section may feature 2 Basic Notes along with a Direction Note.

Figure 8:
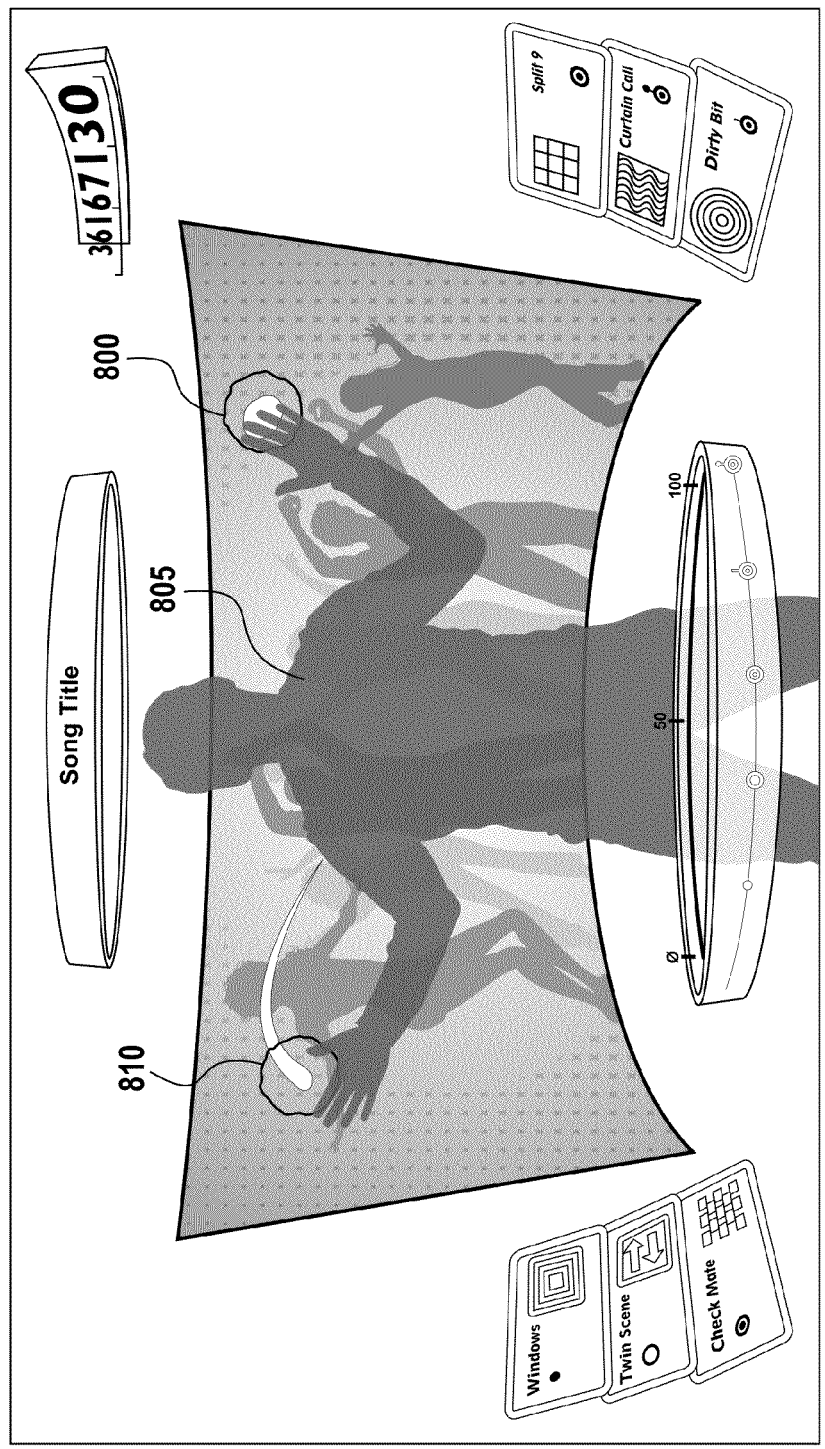
FIG. 8 shows an exemplary screenshot depicting an embodiment of a music video game.

As seen in FIG. 8, a shadow mode is contemplated in an exemplary embodiment. This is an option that the player can turn on or off. As illustrated, a player can see himself/herself in a shadow form 805 on the screen. As the player moves, the shadow 805 on the screen would move in the same way. The Orbs 800, 810 can be programmed to track the hands of the player. This enables the player to gain a visual appreciation of how his/her movements translate to the Orb movements on the screen. It may also provide a more immersive environment. For example, when the player is engaged in the Music and VFX modes, he or she may experience more control over the movement of the entire shadow on the screen, rather than just two Orbs. By seeing his or her own shadow on the screen, the player may also feel like he/she is a part of the video and thus more connected to the music video. All of these factors contribute to the interactive nature and feel of the gameplay.

Another exemplary mode contemplates multiple players. For instance, a competitive mode can be played with 2 players on a single gaming platform or over the Internet (e.g., via XBOX LIVE, the Playstation Network, or a private game server). This mode is similar to Freeplay Mode wherein the player can set the game difficulty and choose any available song. In contrast with the single-player "Freeplay Mode," however, 4 Orbs can appear on the screen at once. Each player controls two Orbs, and is instructed to hit the Sound Notes for points. The number of points scored may be affected by accuracy, number of Sound Notes hit and the type and frequency of VFX used. The player with the highest score at the end of the game wins.

Another aspect of multi-player gameplay involves a cooperative mode. According to one embodiment, this mode is preferably played on more than one gaming console so that each player is looking at his or her own screen during gameplay. This mode can be played over the Internet or between 2 system-linked consoles. One player controls the Music Gameplay on one screen, and the other controls the Music Video VFX on a separate screen. The two players are encouraged to work together to "beat" the song and create a super music video that may not be achievable through single player. For example, Player 1 will see and only play the main Music Gameplay. At any time, Player 1 can select a VFX without the need of the Effects Gauge. In one embodiment, if Player 1 misses a note, then the music and music video will "scratch." "Scratching" is a failed event that may be represented by a substitution of music, sound, or some other effect. For example, instead of playing an actual musical segment of the selected song, "scratching" will cause an alternative music/sound (or a short silence) to be played instead. Similarly, if Player 2 is activating a VFX at this time, then the VFX can be cancelled. When Player 1 selects VFX, Player 2 will need to successfully perform the Guide Notes in mini-games to keep the effect rolling. Player 2 will have to keep performing the Guide Notes associated with the VFX chosen by Player 1. If Player 2 misses a beat during the Music Video VFX Gameplay, then the music video will scratch.

In an alternative embodiment of the cooperative multi-player mode, each player can control a single Orb on a single screen. The mode is similar to a single-player mode, except the players are each only responsible for one Orb and must coordinate on which Sound Notes to hit in the Music Gameplay and on performing the Guide Notes correctly in the Music Video VFX Gameplay.

Also, a tutorial mode will teach and inform players the basic rules of the game. It will be interactive and easy so that it can show the foundations of the gameplay and make it easy to follow for the novice player.

Variations

Although the methods, systems, computer program products, and devices described herein have been presented herein in reference to exemplary embodiments, optionally incorporating various features, the devices, systems and methods described herein are not to be limited to that which is described or indicated as contemplated with respect to each variation. Various changes can be made to the subject matter described herein, and equivalents (whether recited herein or not included for the sake of some brevity) can be substituted without departing from the true spirit and scope of the disclosure. In addition, where a range of values is provided, it is understood that every intervening value, between the upper and lower limit of that range and any other stated or intervening value in that stated range is encompassed within the disclosure. Furthermore, where discrete values or ranges of values are set forth, it should be noted that the methods, systems, computer program products, and devices described herein are not limited to such.

Also, it is contemplated that any optional feature of the inventive variations described can be set forth and claimed independently, or in combination with any one or more of the features described herein. Stated otherwise, it is to be understood that each of the improvements described herein independently offer a valuable contribution to the state of the art.

So too do the various other possible combinations of the improvements/features described herein and/or incorporated by reference, any of which can be claimed.

Reference to a singular item includes the possibility that there is a plurality of the same items present. More specifically, as used herein and in the appended claims, the singular forms "a," "an," "said," and "the" include plural references unless specifically stated otherwise. In other words, use of the articles allow for "at least one" of the subject item in the description above as well as the claims below. It is further noted that the claims can be drafted to exclude any optional element. As such, this statement is intended to serve as antecedent basis for use of such exclusive terminology as "solely," "only" and the like in connection with the recitation of claim elements, or use of a "negative" limitation.

Without the use of such exclusive terminology, the term "comprising" in the claims shall allow for the inclusion of any additional element—irrespective of whether a given number of elements are enumerated in the claim, or the addition of a feature could be regarded as transforming the nature of an element set forth in the claims. Likewise, use of the term "typically" does not exclude other possibilities. It can indicate a preference, however, for the stated characteristic. Except as specifically defined herein, all technical and scientific terms used herein are to be given as broad a commonly understood meaning as possible while maintaining claim validity.

Having described certain embodiments of the invention, it will now become apparent to one of skill in the art that other embodiments incorporating the concepts of the invention may be used. Although the described embodiments generally relate to the field of music-themed and/or rhythm-action games, the principles of the invention can extend to other areas that involve musical interaction, music editing and creation, as well as collaboration or competition by two or more users connected to a network. Accordingly, the invention should not be limited to certain embodiments, but rather should be limited only by the spirit and scope of the following claims.

What is claimed is:

1. A method executed on a gaming platform having a computer processor for executing a computer program product encoded on one or more non-transitory computer-readable media, the gaming platform in communication with an input device and a display device, for facilitating interaction of a user with a music-based video game, the method comprising:

(a) displaying a user interface of a music video game on a screen of the display device, wherein the user interface includes a music video associated with a song chosen by the user, the music video being shown within a background of the user interface of the music video game;

(b) generating by the computer processor a first set of visual data associated with at least one segment of the music video;

(c) receiving a first performance input from the input device;

(d) evaluating the first performance input by comparing the first visual data with the first performance input;

(e) receiving a selection from the input device of a special effect from among a plurality of special effects;

(f) generating by the computer processor a second set of visual data associated with at least one special effect;

(g) receiving a second performance input from the input device;

(h) evaluating the second performance input by comparing the second visual data with the second performance input; and
(i) altering the music video with the selected special effect in response to the second performance input.

2. The method of claim 1, wherein the input device is a motion-tracking sensor.

3. The method of claim 2, wherein the user interface further includes one or more Orbs shown within the user interface, and wherein the movement of the one or more Orbs is controllable by the user via the motion-tracking sensor.

4. The method of claim 1, further comprising the step of associating the first performance input with a positioning of one or more moveable objects shown within the user interface.

5. The method of claim 4, wherein the moveable objects are restricted in their movement based on how fast they are moved within a time period.

6. The method of claim 1, wherein the first set of visual data comprises a plurality of visual objects in a three-dimensional virtual space moving from a background of the virtual space toward the screen of the display device.

7. The method of claim 6, wherein a first visual object of the plurality of visual objects takes a different path than a second visual object of the plurality of visual objects toward the screen of the display device.

8. The method of claim 6, wherein the first set of visual data further comprises a plurality of visual cues corresponding to the plurality of visual objects, wherein each of the plurality of visual objects is configured to move toward the corresponding visual cue.

9. The method of claim 8, wherein each of the plurality of visual cues indicates a location of impact with the corresponding visual object.

10. The method of claim 1, further comprising the step of supplementing the music video with additional sounds based on the evaluation of the first performance input.

11. The method of claim 1, further comprising the step of instructing the user, via the second set of visual data, to perform a plurality of predetermined movements within a predetermined time period.

12. A computer program product for facilitating interaction of a user with a music video game, the computer program product including instructions operable to cause a processor to:
(a) display a user interface of a music video game on a screen of a display device, wherein the user interface includes a music video associated with a song chosen by the user, the music video being shown within a background of the user interface of the music video game;
(b) generate a first set of visual data associated with at least one segment of the music video;
(c) receive a first performance input from an input device;
(d) evaluate the first performance input by comparing the first visual data with the first performance input;
(e) receive a selection from the input device of a special effect from among a plurality of special effects;
(f) generate a second set of visual data associated with at least one special effect;
(g) receive a second performance input from the input device;
(h) evaluate the second performance input by comparing the second visual data with the second performance input; and
(i) alter the music video with the selected special effect in response to the second performance input.

13. The computer program product of claim 12, wherein the input device is a motion-tracking sensor.

14. The computer program product of claim 13, wherein the instructions are operable to cause the data processing apparatus to further display one or more Orbs within the user interface, wherein the movement of the one or more Orbs is controllable by the user via the motion-tracking sensor.

15. The computer program product of claim 12, wherein the instructions are operable to cause the data processing apparatus to further associate the first performance input with a positioning of one or more moveable objects shown within the user interface.

16. The computer program product of claim 15, wherein the moveable objects are restricted in their movement based on how fast they are moved within a time period.

17. The computer program product of claim 12, wherein the instructions are operable to cause the first set of visual data comprising a plurality of visual objects in a three-dimensional virtual space to move from a background of the virtual space toward the screen of the display device.

18. The computer program product of claim 17, wherein a first visual object of the plurality of visual objects takes a different path than a second visual object of the plurality of visual objects toward the screen of the display device.

19. The computer program product of claim 17, wherein the first set of visual data further comprises a plurality of visual cues corresponding to the plurality of visual objects, wherein each of the plurality of visual objects is configured to move toward the corresponding visual cue.

20. The computer program product of claim 19, wherein each of the plurality of visual cues indicates a location of impact with the corresponding visual object.

21. The computer program product of claim 12, wherein the instructions are operable to cause the data processing apparatus to supplement the music video with additional sounds based on the evaluation of the first performance input.

22. The computer program product of claim 12, wherein the second set of visual data instructs the user to perform a plurality of predetermined movements within a predetermined time period.

23. The computer program product of claim 12, wherein the instructions are operable to cause the data processing apparatus to further associate the first performance input with one or more moveable objects representing in-game elements that mimic the movements of a user's hands.

24. A music game system comprising:
an input device for receiving input from a user;
a gaming platform in communication with the input device and configured to communicate with a display device, configured to:
(a) display a user interface of a music video game on a screen of the display device, wherein the user interface includes a music video associated with a song chosen by the user, the music video being shown within a background of the user interface of the music video game;
(b) generate a first set of visual data associated with at least one segment of the music video;
(c) receive a first performance input from the input device;
(d) evaluate the first performance input by comparing the first set of visual data with the first performance input;
(e) receive a selection from the input device of a special effect from among a plurality of special effects;
(f) generate by the computer processor a second set of visual data associated with at least one special effect;

(g) receive a second performance input from the input device;

(h) evaluate the second performance input by comparing the second visual data with the second performance input; and (i) alter the music video with the selected special effect in response to the second performance input.

25. The system of claim 24, wherein the input device is a motion-tracking sensor.

26. The system of claim 25, wherein the gaming platform is further configured to display one or more Orbs within the user interface, wherein the movement of the one or more Orbs is controllable by the user via the motion-tracking sensor.

27. The system of claim 24, wherein the gaming platform is further configured to associate the first performance input with a positioning of one or more moveable objects shown within the user interface.

28. The system of claim 27, wherein the moveable objects are restricted in their movement based on how fast they are moved within a time period.

29. The system of claim 24, wherein the first set of visual data comprises a plurality of visual objects in a three-dimensional virtual space moving from a background of the virtual space toward the screen of the display device.

30. The system of claim 29, wherein a first visual object of the plurality of visual objects takes a different path than a second visual object of the plurality of visual objects toward the screen of the display device.

31. The system of claim 29, wherein the first set of visual data further comprises a plurality of visual cues corresponding to the plurality of visual objects, wherein each of the plurality of visual objects is configured to move toward the corresponding visual cue.

32. The system of claim 31, wherein each of the plurality of visual cues indicates a location of impact with the corresponding visual object.

33. The system of claim 24, wherein the instructions are operable to cause the data processing apparatus to further supplement the music video with additional sounds based on the evaluation of the first performance input.

34. The system of claim 24, wherein the second set of visual data instructs the user to perform a plurality of predetermined movements within a predetermined time period.

* * * * *